(12) United States Patent
Yoon et al.

(10) Patent No.: US 9,726,952 B2
(45) Date of Patent: *Aug. 8, 2017

(54) LIQUID CRYSTAL DISPLAY HAVING WIDE VIEWING ANGLE

(71) Applicant: SAMSUNG DISPLAY CO., LTD., Yongin, Gyeonggi-do (KR)

(72) Inventors: Young-Soo Yoon, Anyang-si (KR); Joon-Chul Goh, Hwaseong-si (KR); Sang-Uk Lim, Cheonan-si (KR); Chongchul Chai, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/981,498

(22) Filed: Dec. 28, 2015

(65) Prior Publication Data

US 2016/0116785 A1    Apr. 28, 2016

Related U.S. Application Data

(62) Division of application No. 13/442,588, filed on Apr. 9, 2012, now Pat. No. 9,223,182.

(30) Foreign Application Priority Data

Sep. 27, 2011 (KR) .......................... 10-2011-0097719

(51) Int. Cl.
| G09G 3/36 | (2006.01) |
| G02F 1/1362 | (2006.01) |
| G02F 1/1343 | (2006.01) |
| G02F 1/1368 | (2006.01) |

(52) U.S. Cl.
CPC ........ *G02F 1/13624* (2013.01); *G02F 1/1368* (2013.01); *G02F 1/134309* (2013.01); *G02F 1/136213* (2013.01); *G02F 1/136286* (2013.01); *G02F 2001/134345* (2013.01); *G09G 3/3677* (2013.01); *G09G 3/3688* (2013.01)

(58) Field of Classification Search
None
See application file for complete search history.

(56) References Cited

U.S. PATENT DOCUMENTS 6,122,489 A * 9/2000 Yorita ................... H01P 1/2053
                                                        333/134
7,576,720 B2   8/2009 Lin et al.
(Continued)

FOREIGN PATENT DOCUMENTS

| JP | 2007-156429 A | 6/2007 |
| KR | 10-2007-0002221 A | 1/2007 |
| KR | 10-2014-0083965 A | 7/2014 |

*Primary Examiner* — Kent Chang
*Assistant Examiner* — Nathan Brittingham
(74) *Attorney, Agent, or Firm* — Innovation Counsel LLP

(57) ABSTRACT

A liquid crystal display includes first and second sub-pixels charged with the same voltage during a first period. The voltage charged in the second sub-pixel is decreased after the first period. Since the voltage level of the first sub-pixel is different from the voltage level of the second sub-pixel after the first period, liquid crystal molecules disposed corresponding to the first sub-pixel are aligned in a direction different from that of liquid crystal molecules disposed corresponding to the second sub-pixel. Thus, a side viewing angle of the liquid crystal display is improved.

17 Claims, 16 Drawing Sheets

(56) References Cited

U.S. PATENT DOCUMENTS

| | | | |
|---|---|---|---|
| 2002/0070382 A1* | 6/2002 | Yamazaki | G02F 1/13454 257/72 |
| 2003/0102498 A1* | 6/2003 | Braithwaite | H01L 27/0617 257/288 |
| 2006/0164354 A1* | 7/2006 | Lee | G02F 1/136213 345/89 |
| 2006/0170835 A1* | 8/2006 | Jun | G02F 1/136213 349/38 |
| 2006/0286703 A1* | 12/2006 | Um | G02F 1/13624 438/30 |
| 2007/0188430 A1* | 8/2007 | Moon | G09G 3/3648 345/89 |
| 2007/0195248 A1 | 8/2007 | Huh et al. | |
| 2007/0216832 A1* | 9/2007 | Takahashi | G02F 1/133516 349/106 |
| 2009/0027581 A1* | 1/2009 | You | G02F 1/13624 349/48 |
| 2009/0040413 A1 | 2/2009 | Chen et al. | |
| 2009/0134328 A1* | 5/2009 | Yamaguchi | G06K 9/00033 250/332 |
| 2009/0278130 A1* | 11/2009 | Jun | G02F 1/136213 257/59 |
| 2010/0007594 A1* | 1/2010 | Lai | G02F 1/136213 345/98 |
| 2010/0220116 A1* | 9/2010 | Liao | G09G 3/3659 345/690 |
| 2011/0006192 A1* | 1/2011 | Miyazawa | H01L 27/14609 250/208.1 |
| 2011/0019115 A1* | 1/2011 | Jun | G02F 1/136213 349/41 |
| 2011/0043718 A1* | 2/2011 | Chin | G06F 3/0412 349/39 |
| 2011/0115998 A1* | 5/2011 | Liao | G02F 1/136213 349/38 |
| 2011/0173080 A1* | 7/2011 | Kutsumi | G06Q 30/0277 705/14.73 |
| 2012/0074297 A1* | 3/2012 | Yonekura | H01L 27/1461 250/208.1 |
| 2013/0077002 A1* | 3/2013 | Yoon | G02F 1/136213 349/38 |

\* cited by examiner

LIQUID CRYSTAL DISPLAY HAVING WIDE VIEWING ANGLE

CROSS-REFERENCE TO RELATED APPLICATIONS

This application is a divisional of U.S. patent application Ser. No. 13/442,588 filed on Apr. 9, 2012 and relies for priority upon Korean Patent Application No. 10-2011-0097719 filed on Sep. 27, 2011, the contents of which are herein incorporated by reference in their entirety.

BACKGROUND

1. Field of Disclosure

Embodiments of the present invention relate generally to liquid crystal displays. More particularly, embodiments of the present invention relate to liquid crystal displays capable of improving display quality thereof.

2. Description of the Related Art

Recently, various modes have been developed for improvement in liquid crystal display quality. Such modes include a patterned vertical alignment (PVA) mode, a multi-domain vertical alignment (MVA) mode, a super-patterned vertical alignment (S-PVA) mode, a super vertical alignment (SVA) mode, and the like.

For liquid crystal displays in which one pixel includes two sub-pixels, such as S-PVA mode liquid crystal displays or SVA mode liquid crystal displays, different sub-voltages are applied to the two sub-pixels of each pixel.

In the S-PVA mode liquid crystal display or the SVA mode liquid crystal display, the liquid crystal molecules in the two sub-pixels have different inclination angles from each other when an electric field is applied to the pixels. Accordingly, a side viewing angle of the liquid crystal displays is widened.

SUMMARY

Exemplary embodiments of the present invention provide a liquid crystal display capable of improving an aperture ratio and a side visibility.

According to the exemplary embodiments, a liquid crystal display includes a gate line, a data line, a first sub-pixel, a second sub-pixel, a first sharing capacitor, and a connection part. The gate line is configured to receive a gate-on signal during a first period of a frame period and the data line crosses the gate line and receives a data voltage. The first sub-pixel is connected to the gate line and the data line to receive the data voltage in response to the gate-on signal, and the second sub-pixel is connected to the gate line and the data line to receive the data voltage in response to the gate-on signal. The first sharing capacitor includes a first electrode and a second electrode electrically connected to the first sub-pixel, and the connection part is electrically connected the first electrode of the first sharing capacitor to the second sub-pixel after the first period.

The connection part includes a first material whose a resistance value decreases when exposed to a light.

The liquid crystal display further includes a first reset line configured to receive a first reset signal, and a first transistor connected to the gate line and the first reset line to output the first reset signal in response to the gate-on signal.

The first sub-pixel includes a second transistor connected to the gate line and the data line to output the data voltage in response to the gate-on signal, and a first liquid crystal capacitor for receiving the data voltage from the second transistor.

The second sub-pixel includes a third transistor connected to the gate line and the data line to output the data voltage in response to the gate-on signal, and a second liquid crystal capacitor for receiving the data voltage from the third transistor.

According to another exemplary embodiment, the liquid crystal display further includes a second reset line configured to receive a second reset signal. In this case, the first electrode of the first sharing capacitor is connected to the first transistor and the second electrode of the first sharing capacitor is connected to the second reset line.

According to another exemplary embodiment, the liquid crystal display further includes a second reset line configured to receive a second reset signal and a second sharing capacitor. The second sharing capacitor includes a first electrode connected to the second reset line and a second electrode connected to the first transistor.

According to another exemplary embodiment, the connection part may be a transistor including a source electrode connected to the second liquid crystal capacitor, a drain electrode connected to the first sharing capacitor, and a gate electrode that is floated.

According to the above, the two sub-pixels are respectively charged with voltages having different voltage levels from each other, thereby widening the side viewing angle of the liquid crystal display. As a result, the liquid crystal display may have improved display quality.

In addition, the structure of the gate line and the data line in the liquid crystal display, which apply signals to the pixel, may be simplified, to thereby improve an aperture ratio of the liquid crystal display.

Further, since the sharing capacitor is applied with the reset voltage during the gate-on period to be initialized, the reliability on the operation of the sharing capacitor may be improved.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION

Figure 1:
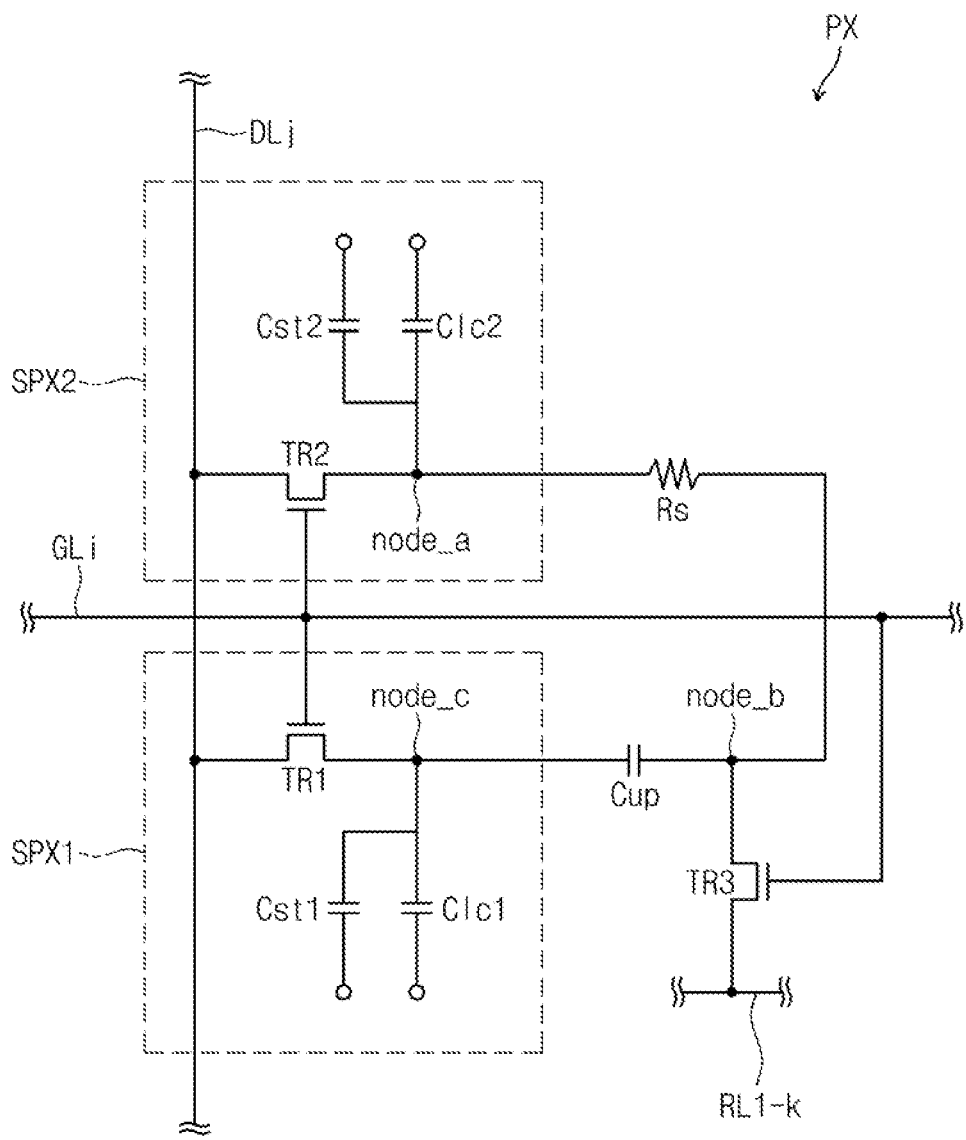
FIG. 1 is an equivalent circuit diagram showing a pixel included in a liquid crystal display according to an exemplary embodiment of the present invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
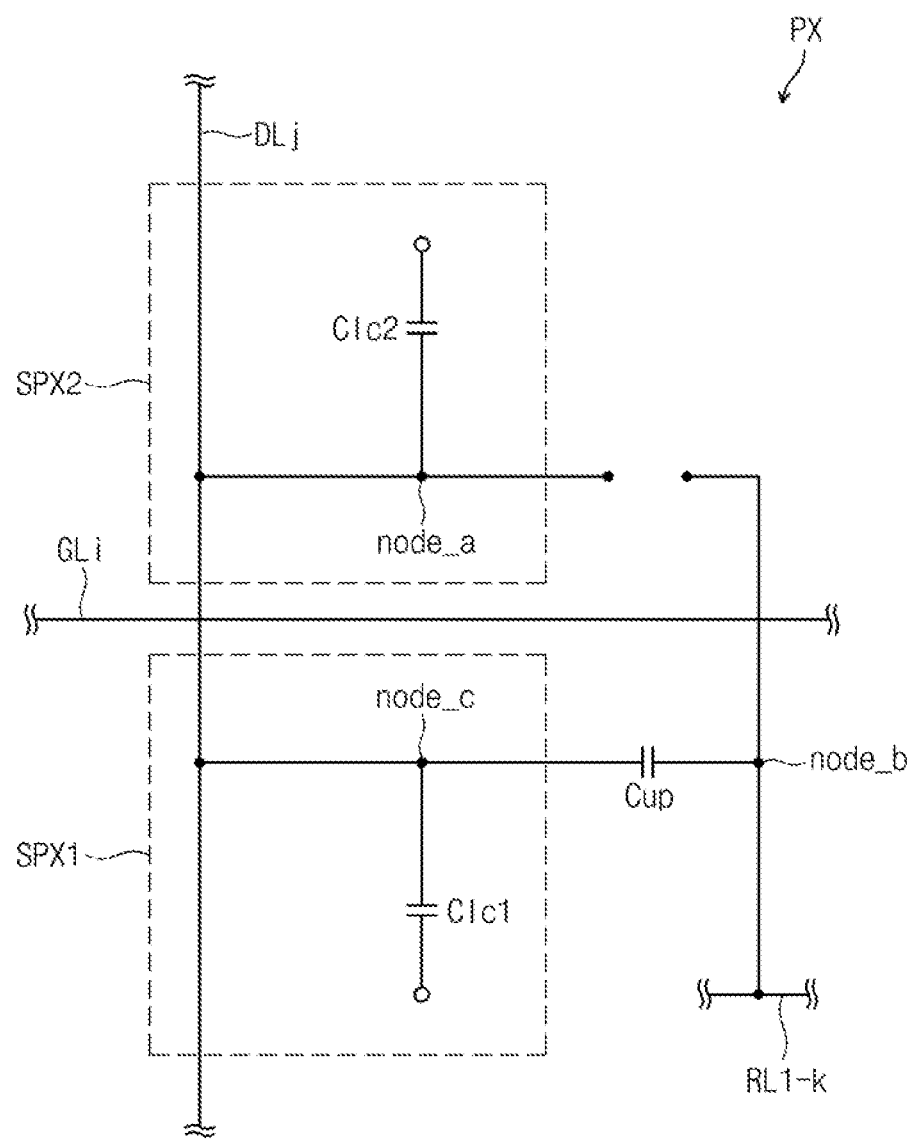
FIGS. 2 and 3 are equivalent circuit diagrams showing the pixel shown in FIG. 1, which is driven in response to a gate signal.
Figure 3:
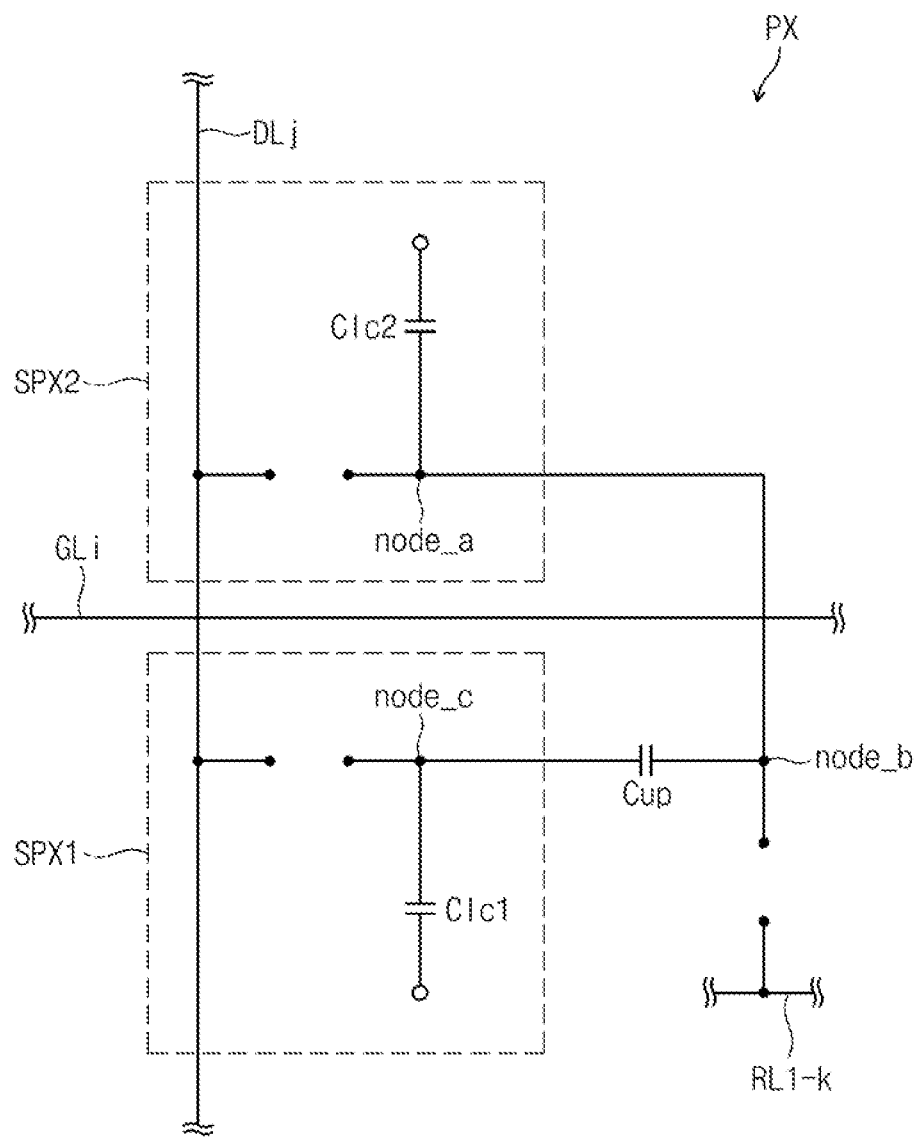
Figure 4:
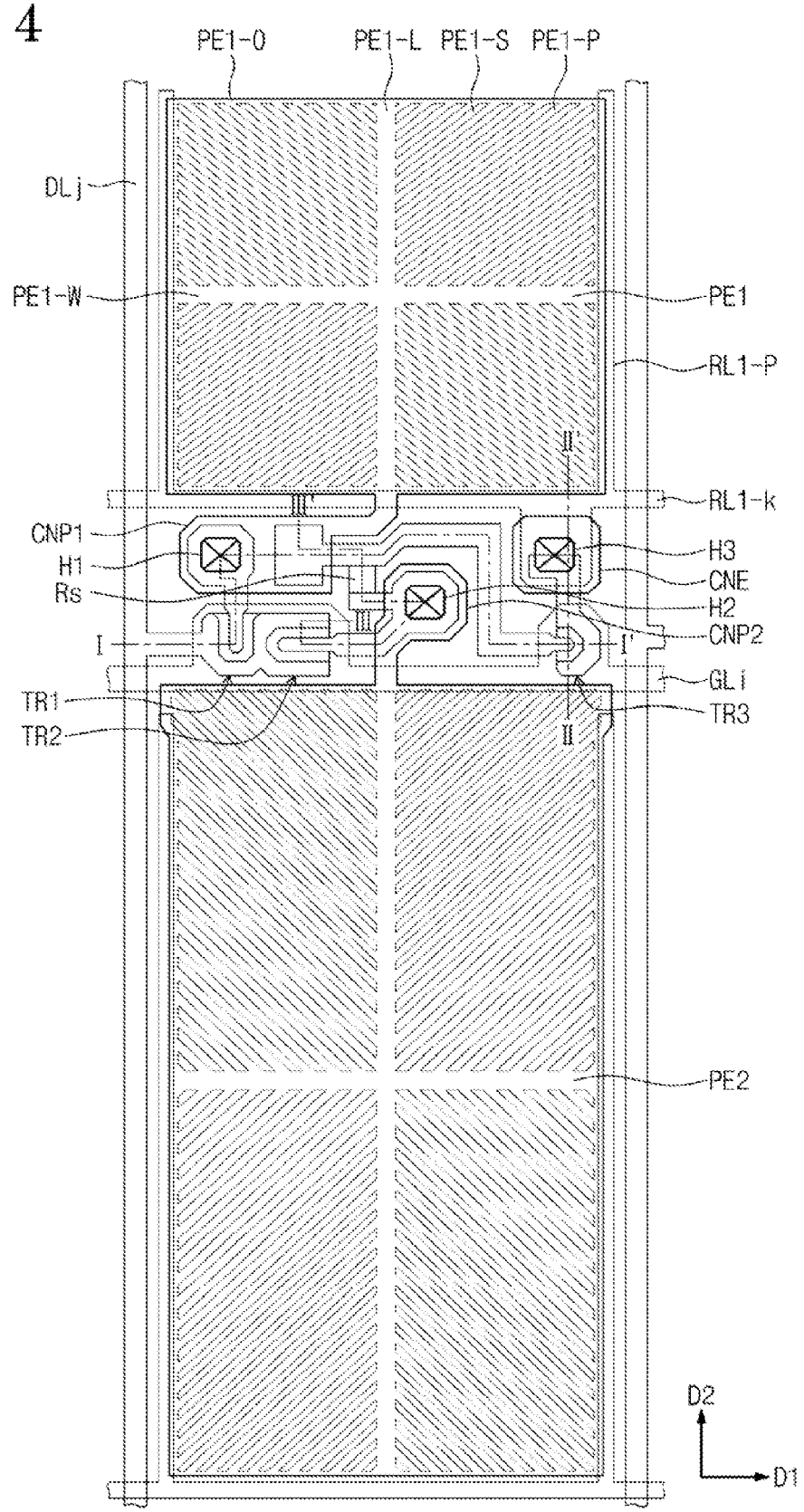
FIG. 4 is a plan view showing the pixel shown in FIG. 1 according to an exemplary embodiment of the present invention.
Figure 8:
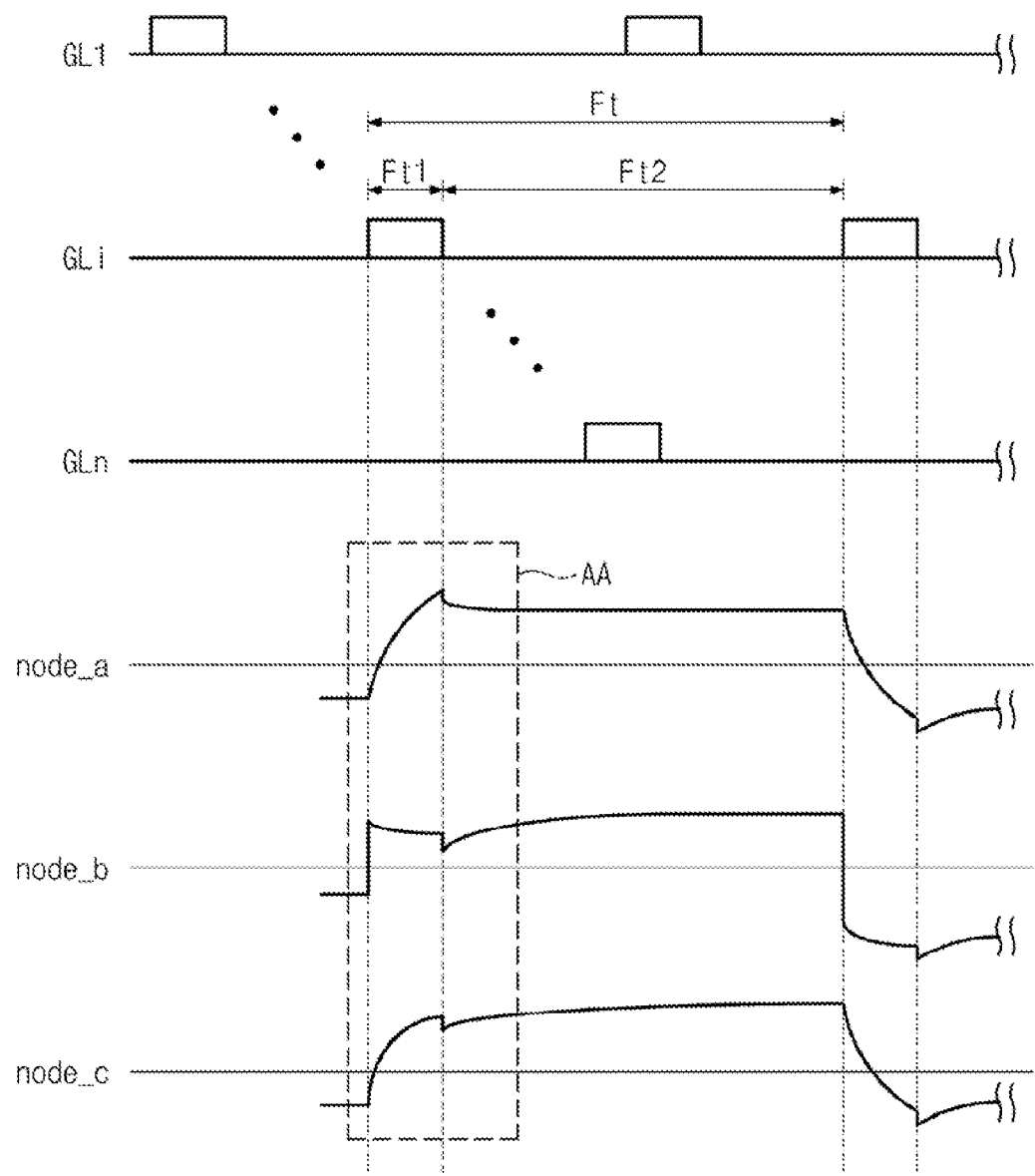
FIG. 8 is a timing diagram showing an operation of the pixel shown in FIG. 1.
Figure 9:
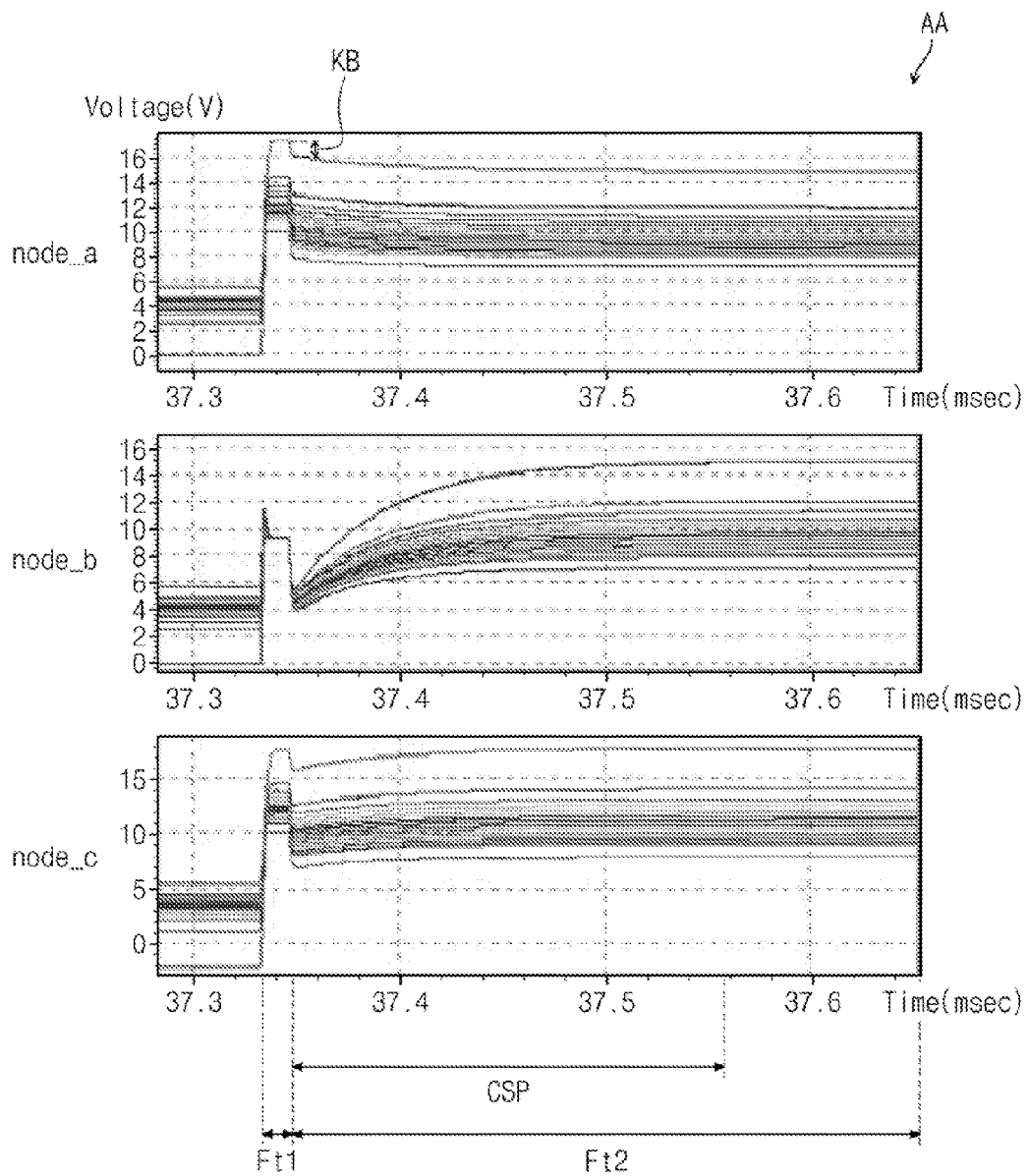
FIG. 9 is a simulation graph showing a portion AA shown in FIG. 8.

FIG. 1 is an equivalent circuit diagram showing a pixel included in a liquid crystal display according to an exemplary embodiment of the present invention, and FIGS. 2 and 3 are equivalent circuit diagrams showing the pixel shown in FIG. 1, which is driven in response to a gate signal. FIG. 4 is a plan view showing the pixel shown in FIG. 1 and FIGS. 5, 6, and 7 are cross-sectional views respectively taken along lines I-I', II-II' and III-III' shown in FIG. 4. In addition, FIG. 8 is a timing diagram showing an operation of the pixel shown in FIG. 1 and FIG. 9 is a simulation graph showing a portion AA shown in FIG. 8.

In the present exemplary embodiment, the pixels included in the liquid crystal display each have the same structure and function, and thus one pixel PX has been shown in FIGS. 1 to 3 as a representative example.

In addition, FIG. 4 shows a layout of the pixel having the equivalent circuit diagrams shown in FIGS. 1 to 3 and a gate line GLi, a data line DLj, and a first reset line RL1-k have been shown in FIG. 4 to represent a plurality of gate lines, a plurality of data lines, and a plurality of reset lines, which are included in the liquid crystal display.

Referring to FIG. 1, the pixel PX includes a first sub-pixel SPX1 that has a first transistor TR1 and a first liquid crystal capacitor Clc1, a second sub-pixel SPX2 that has a second transistor TR2 and a second liquid crystal capacitor Clc2, a third transistor TR3, a connection resistor Rs, and a sharing capacitor Cup.

The first transistor TR1 is connected to the gate line GLi and the data line DLj, and outputs a data voltage in response to a gate-on signal. In addition, the second transistor TR2 is connected to the gate line GLi and the data line DLj, and also outputs the data voltage in response to the gate-on signal.

The first transistor TR1 is connected to the first liquid crystal capacitor Clc1 at a third node node_c. The first liquid crystal capacitor Clc1 includes a first pixel electrode PE1 (refer to FIGS. 4 to 7) applied with the data voltage output from the first transistor TR1, and a common electrode 122 (refer to FIGS. 4 to 7) facing the first electrode PE1.

The second transistor TR2 is connected to the second liquid crystal capacitor Clc2 at a first node node_a. The second liquid crystal capacitor Clc2 includes a second pixel electrode PE2 (refer to FIGS. 4 to 7) applied with the data voltage output from the second transistor TR2, and the common electrode 122 facing the second pixel electrode PE2.

The third transistor TR3 is connected to the gate line GLi and the first reset line RL1-k, and outputs a first reset voltage in response to the gate-on signal. As an example, the first reset line RL1-k may be a storage line and the first reset voltage may be a storage voltage.

The first reset voltage has a level different from a level of the data voltage. In the present exemplary embodiment, the data voltage is larger than the first reset voltage.

The connection resistor Rs is connected to the second transistor TR2 and the second liquid crystal capacitor Clc2 at the first node node_a, and connected to the third transistor TR3 and the sharing capacitor Cup at the second node node_b.

As will be further explained below, the first node node_a and the second node node_b are electrically disconnected from each other by the connection resistor Rs and transistors TR1 and TR2 during a gate-on period Ft1 shown in FIG. 8 (hereinafter, referred to as a first period) of one frame period Ft (refer to FIG. 8). In addition, The first node node_a and the second node node_b are electrically connected to each other by the connection resistor Rs and transistors TR1 and TR2 during a gate-off period Ft2 shown in FIG. 8 (hereinafter, referred to as a second period) of the one frame period Ft (refer to FIG. 8).

Meanwhile, when the liquid crystal display is operated at about 60 Hz, one frame period may be 1/60 of a second. In addition, the first period Ft1 in which the gate-on signal (e.g., a high level of the gate voltage) or pulse is applied to the gate line GLi is much shorter than the second period Ft2 in which the gate-off signal (e.g., the low level of the gate voltage) is applied to the gate line GLi.

The sharing capacitor Cup includes a first electrode and a second electrode. The first electrode of the sharing capacitor Cup is connected to the connection resistor Rs and the third transistor TR3 at the second node node_b, and the second electrode of the sharing capacitor Cup is connected to the first transistor TR1 and the first liquid crystal capacitor Clc1 at the third node node_c.

The sharing capacitor Cup receives the data voltage from the first transistor TR1 and the first reset voltage from the third transistor TR3, to be charged with the difference between the data voltage and the first voltage. When the sharing capacitor Cup is operated, the voltage at the third node node_c is increased and the voltage at the first node node_a is decreased after the first period Ft1.

Meanwhile, the first sub-pixel SPX1 and the second sub-pixel SPX2 may further include a first storage capacitor Cst1 and a second storage capacitor Cst2 respectively, as shown in FIGS. 1 to 3. The first storage capacitor Cst1 is configured to include the first pixel electrode PE1 and the first reset line RL1-k, and the second storage capacitor Cst2 is configured to include the second pixel electrode PE2 and the first reset line RL1-k.

Hereinafter, the configuration of the pixel PX will be described in further detail with reference to FIGS. 4 to 7.

The liquid crystal display includes a first substrate 110 on which the first, second, and third transistors TR1, TR2, and TR3 are disposed, a second substrate 120 on which the common electrode 122 is disposed, and a liquid crystal layer 130 interposed between the first substrate 110 and the second substrate 120. The first and second substrates 110 and 120 face each other.

The first substrate 110 includes a first base substrate 111 on which the gate line GLi and the data line DLj are disposed. The gate line GLi is extended in a first direction D1 and the data line DLj is extended in a second direction D2 crossing the first direction D1. The data line DLj is insulated from the gate line GLi while crossing the gate line GLi.

In addition, the first reset line RL1-k is extended in the first direction D1 on the first base substrate 111, to receive the reset voltage. The first reset line RL1-k further includes a branch portion RL1-P protruding in the second direction when viewed in a plan view. The branch portion RL1-P partially overlaps the first pixel electrode PE1. The first reset line RL1-k may be disposed on the same layer as the gate line GLi.

Figure 5:
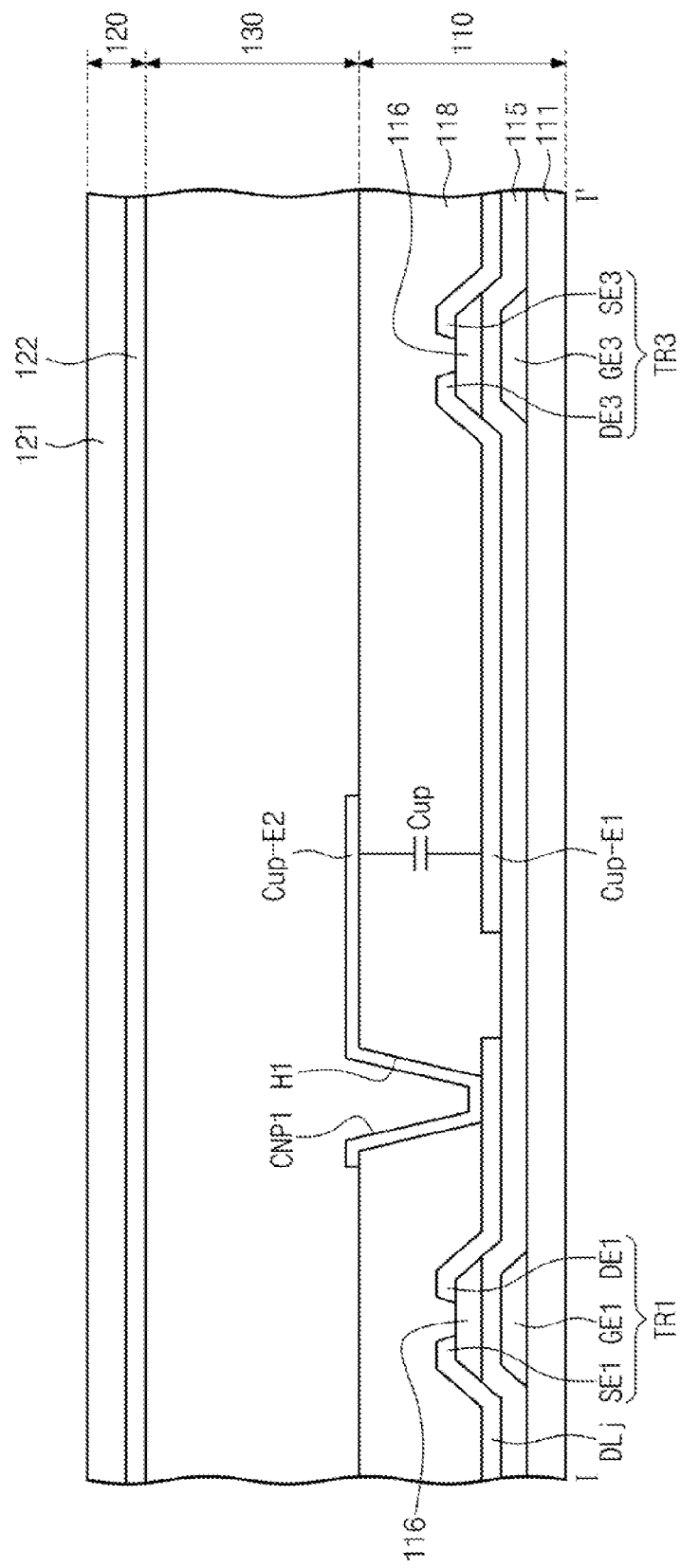
FIG. 5 is a cross-sectional view taken along a line I-I' shown in FIG. 4.

As shown in FIGS. 4 and 5, the first transistor TR1 includes a first gate electrode GE1, a first source electrode SE1, and a first drain electrode DE1. The gate electrode GE1 branches out from the gate line GLi. A first insulating layer 115 is disposed on the first base substrate 111 to cover the first gate electrode GE1, and the first source electrode SE1 (extending from the data line DLj) and the first drain electrode DE1 are spaced apart from each other and are disposed on the first insulating layer 115.

An active layer 116 is disposed in the area between the first source electrode SE1 and the first drain electrode DE1. The active layer 116 may be formed of amorphous silicon (a-Si). Although not shown in the figures, an ohmic contact layer (not shown) may also be disposed between the active layer 116 and the first source electrode SE1, and between the active layer 116 and the first drain electrode DE1. The ohmic contact layer may be formed of an n-type amorphous silicon (n+ a-Si:h).

Figure 6:
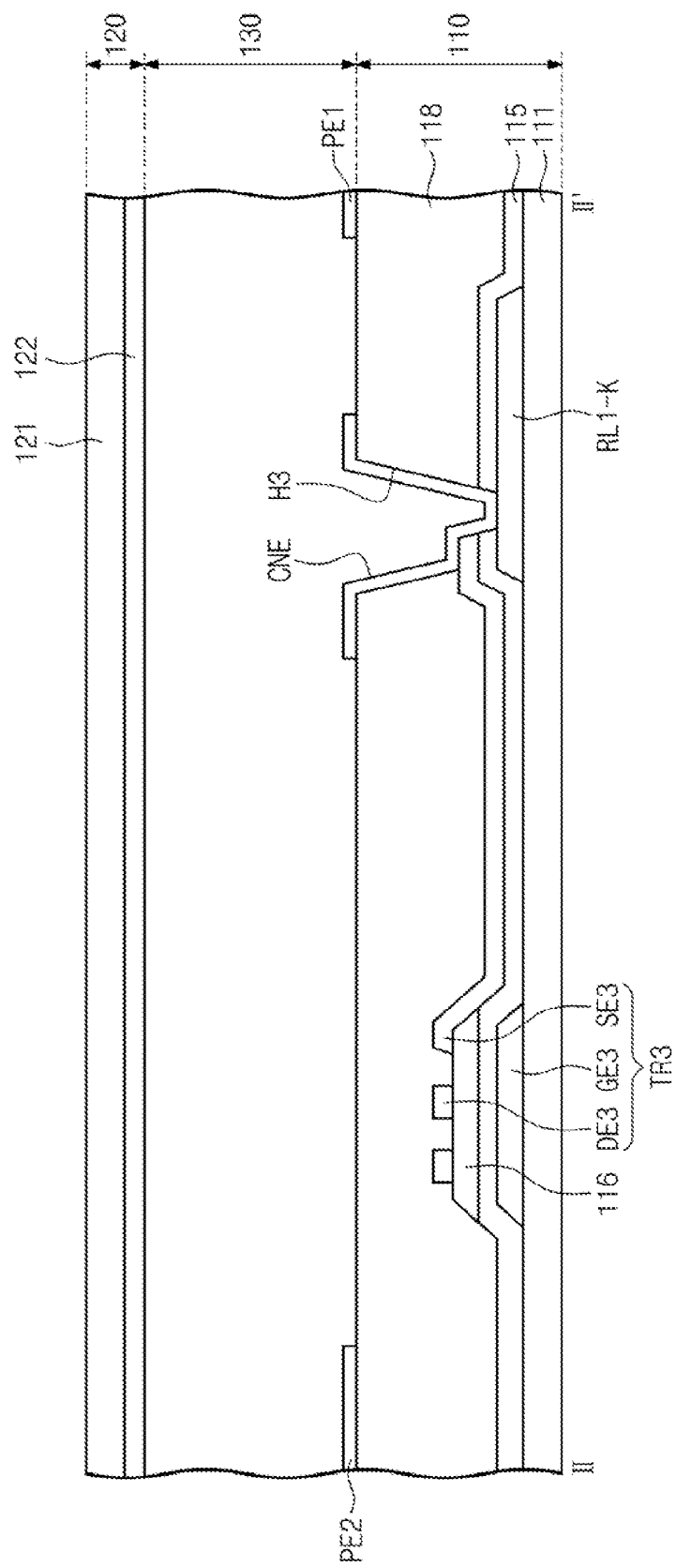
FIG. 6 is a cross-sectional view taken along a line II-II' shown in FIG. 4.

As shown in FIGS. 4 and 6, the third transistor TR3 includes a third gate electrode GE3, a third source electrode SE3, and a third drain electrode DE3 spaced apart from the third source electrode SE3 by a predetermined distance. The third gate electrode GE3 is branched out from the gate line GLi. The third gate electrode GE3 is covered by the first insulating layer 115. The active layer 116 is disposed on the first insulating layer 115, and the third source electrode SE3 and the third drain electrode DE3 are disposed on the active layer 116 to be spaced apart from each other. The ohmic contact layer (not shown) may be further disposed between the active layer 116 and the third source electrode SE3, and between the active layer 116 and the third drain electrode DE3.

The third source electrode SE3 is extended to partially cover the first reset line RL1-k. The first insulating layer 115 is disposed between the first reset line RL1-k and the third source electrode SE3. The third source electrode SE3 and the first reset line RL1-k are electrically connected to each other by a connection electrode CNE.

A second insulating layer 118 is disposed on the first base substrate 111 to cover the first and third source electrode SE1 and SE3 and the first and third drain electrodes DE1 and DE3. In addition, the second insulating layer 118 covers a second source electrode SE2 and a second drain electrode DE2 of a second transistor described below. The second insulating layer 118 may include silicon nitride (SiNx) or silicon oxide (SiO2).

As shown in FIGS. 4 and 6, the first pixel electrode PE1 is disposed on the second insulating layer 118. The first pixel electrode PE1 includes a trunk portion, an outer portion PE1-O connected to the trunk portion, and a first connection portion CNP1 protruded from the outer portion PE1-O to overlap with the first drain electrode DE1. The trunk portion includes a horizontal trunk portion PE1-W and a vertical trunk portion PE1-L to generally form a cross shape.

The first pixel electrode PE1 is divided into four sub-areas by the generally cross-shaped trunk portion. Each sub-area includes a plurality of fine branch portions PE1-P extending at oblique angles from the trunk portion. A slit PE1-S is positioned between two adjacent branch portions. The branch portions PE1-P form angles of about 45 degrees, about 135 degrees, about 225 degrees, and about 315 degrees with the horizontal trunk portion PE1-W.

As described above, since the first pixel electrode PE1 extends across the four sub-areas in which the branch portions PE1-P forming different angles with the horizontal trunk portion PE1-W are disposed, liquid crystal molecules included in the liquid crystal layer 130 are inclined in four different directions. Thus, the viewing angle of the liquid crystal display may be widened.

As shown in FIG. 5, the second insulating layer 118 is provided with a first contact hole H1 formed therethrough, to expose at least a portion of the first drain electrode DE1. The first pixel electrode PE1 is connected to the first drain electrode DE1 through the first contact hole H1. The first connection portion CNP1 may be connected to the first drain electrode DE1.

The first electrode Cup-E1 of the sharing capacitor Cup is disposed on the first insulating layer 115 and a second electrode Cup-E2 is disposed on the second insulating layer 118. In other words, the first electrode Cup-E1 and the second electrode Cup-E2 face each other while interposing the second insulating layer 118 therebetween.

The first electrode Cup-E1 is physically connected to the third drain electrode DE3 and the second electrode Cup-E2 is physically connected to the first pixel electrode PE1. In detail, the second electrode Cup-E2 is connected to the first connection portion CNP1 included in the first pixel electrode PE1, to serve as a portion of the first pixel electrode PE1.

As shown in FIG. 6, the first and second insulating layers 115 and 118 are provided with a third contact hole H3 formed therethrough, to expose at least a portion of the third source electrode SE3 and at least a portion of the first reset line RL1-k. The third source electrode SE3 and the first reset line RL1-k are electrically connected to each other by the connection electrode CNE disposed in the third contact hole H3. In order to easily connect the connection electrode CNE and the first reset line RL1-k, the first reset line RL1-k may include a portion protruded to (i.e. extending to, or under) the third source electrode SE3 in a plan view.

Figure 7:
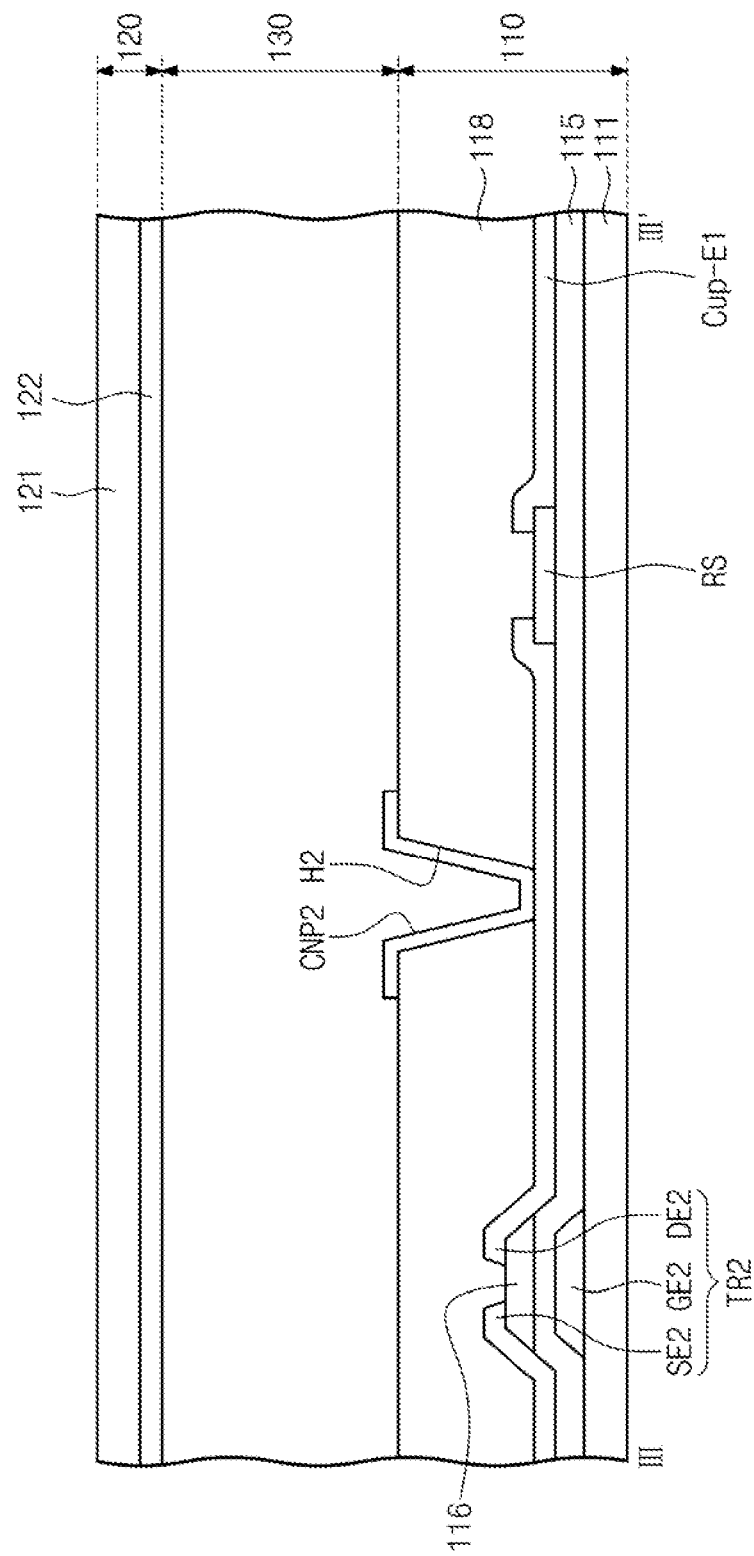
FIG. 7 is a cross-sectional view taken along a line III-III' shown in FIG. 4.

As shown in FIGS. 4 and 7, the second transistor TR2 includes a second gate electrode GE2 extending from the gate line GLi, the second source electrode SE2 extending from the data line DLj, and the second drain electrode DE2 spaced apart from the second source electrode SE2. The second gate electrode GE2 is covered by the first insulating layer 115. The second source electrode SE2 and the second drain electrode DE2 are disposed on the first insulating layer 115. The active layer 116 is disposed in the area between the second source electrode SE2 and the second drain electrode DE2.

The second pixel electrode PE2 is disposed on the second insulating layer 118 covering the second source electrode SE2 and the second drain electrode DE2. Similar to the first pixel electrode PE1, the second pixel electrode PE2 includes a trunk portion, an outer portion connected to the trunk portion, and a second connection portion CNP2 protruded from the outer portion to overlap with the second drain electrode DE2. The trunk portion includes a horizontal trunk portion and a vertical trunk portion to form a cross shape, or a shape similar thereto. The second pixel electrode PE2 is divided into four sub-areas by its generally cross-shaped trunk portion. Each sub-area includes a plurality of fine branch portions obliquely extended from the trunk portion.

The second pixel electrode PE2 is connected to the second drain electrode DE2 through a second contact hole H2 formed through the second insulating layer 118. The second connection portion CNP2 may be connected to the second drain electrode DE2.

As shown in FIGS. 4 to 7, the first electrode Cup-E1 of the sharing capacitor Cup is physically separated from the second pixel electrode PE2.

The connection resistor Rs physically connects the first electrode Cup-E1 of the sharing capacitor Cup and the second pixel electrode PE2. As shown in FIG. 7, the second connection portion CNP2 is connected to a portion of the second drain electrode DE2, and a portion of the second drain electrode DE2 is connected to the first electrode Cup-E1 of the sharing capacitor Cup through the connection resistor Rs.

The connection resistor Rs may be disposed on the same layer as the second drain electrode DE2 and the third drain electrode DE3, and include a material, e.g., amorphous silicon, whose resistance decreases and conductance increases to pass electric charges when exposed to light. The light is provided from a backlight unit (not shown) included in the liquid crystal display.

The second substrate 120 includes a second base substrate 121 facing the first base substrate 111 and the common electrode 122 disposed on the second base substrate 121.

The common electrode 122 is disposed over the second base substrate 121. The common electrode 122 faces the first pixel electrode PE1 and the second pixel electrode PE2 while interposing the liquid crystal layer 130 therebetween.

The liquid crystal molecules included in the liquid crystal layer 130 have a negative dielectric anisotropy. In addition, the liquid crystal molecules may be aligned such that their long axes are nearly perpendicular to a surface of the first and second substrates 110 and 120 when no electric field is applied thereto.

Hereinafter, the operation of the pixel with the equivalent circuit diagram shown in FIG. 1 will be described in detail with reference to FIGS. 2, 3, 8, and 9. For the convenience of explanation, however, the influence of the first storage capacitor Cst1 and the second storage capacitor Cst2 on the pixel PX will be omitted.

During the frame period Ft, the gate lines disposed on the liquid crystal display sequentially receive the gate-on signal. In other words, each gate line receives the gate-on signal only during a predetermined period, e.g., the first period Ft1, of the frame period Ft.

Referring to FIGS. 2 and 8, the first transistor TR1 and the second transistor TR2 are turned on during the first period Ft1. In addition, the common voltage is applied to the common electrode 122 and the first reset voltage is applied to the first reset line RL1-k during the first period Ft1. The first node node_a and the second node node_b are disconnected from each other during the first period Ft1.

The first liquid crystal capacitor Clc1 receives the data voltage through the first transistor TR1, and the second liquid crystal capacitor Clc2 receives the data voltage through the second transistor TR2.

During the first period Ft1, the first pixel voltage and the second pixel voltage, respectively applied to the first pixel electrode PE1 and the second pixel electrode PE2, have the same level as the data voltage. The voltage level at the first node node_a is thus the same as the data voltage. Accordingly, the amount of electric charge at the first node node_a is as follows.

$$Qa = (Vd - V\text{com})C2 \qquad \text{Equation 1}$$

In Equation 1, Qa denotes the amount of electric charge at the first node node_a, Vd denotes the data voltage, Vcom denotes the common voltage, and C2 denotes a charge capacitance of the second liquid crystal capacitor Clc2.

Meanwhile, during the first period Ft1, the voltage level at the second node node_b is the same as the first reset voltage, and the voltage level at the third node node_c is the same as the data voltage.

Thus, the sharing capacitor Cup is charged with the voltage difference between the first reset voltage and the data voltage. Since the amount of electric charge at the second node node_b is the same as the amount of electric charge charged in the sharing capacitor Cup, the amount of electric charge at the second node node_b satisfies the following Equation 2.

$$Qb=(Vr1-Vd)SCp \qquad \text{Equation 2}$$

In Equation 2, Qb denotes the amount of electric charge at the second node node_b, Vr1 denotes the first reset voltage, and Cp denotes a charge capacitance of the sharing capacitor Cup.

Referring to FIGS. 3 and 8, the first transistor TR1, the second transistor TR2, and the third transistor TR3 are turned off during the second period Ft2 following the first period Ft1.

In this case, the first node node_a and the second node node_b are connected to each other across resistor Rs during the second period Ft2. The first node node_a and the second node node_b thus share electric charges through the connection resistor Rs. However, since the first period Ft1 is sufficiently short compared to the second period Ft2, the equivalent circuit of the pixel can represent that the first node node_a and the second node node_b are disconnected from each other during the first period Ft1. On the other hand, the second period Ft2 is very long compared to the first period Ft1, and thus the equivalent circuit of the pixel represents that the first node node_a and the second node node_b are shorted to each other during the second period Ft2.

In order to electrically disconnect (or at least approximately electrically disconnect) the first node node_a from the second node node_b during the first period Ft1, the connection resistor Rs has a resistance value Rrs greater than a resistance value (hereinafter, referred to as turn-on resistance) obtained when the second transistor TR2 and the third transistor TR3 are turned on. In the present exemplary embodiment, the connection resistor Rs may have a resistance value at least one-hundred times greater than the turn-on resistance. For instance, when the turn-on resistance of the second transistor TR2 and the third transistor TR3 is about $10^6$ ohms, the resistance value of the connection resistor Rs is about $10^8$ ohms or more.

The resistance value of the connection resistor Rs is smaller than a critical resistance value during the second period Ft2, in order to electrically connect the first node_a and the second node node_b. The critical resistance value is the resistance value of the connection resistor Rs that produces a time constant for the circuit PX that is three times Pτ. The time constant Pτ indicates a response time of a circuit required to achieve 63% with respect to an external input. In addition, the time constant Pτ is represented by the following Equation 3.

$$P\tau=RrsS(C2+Cp//C1) \qquad \text{Equation 3}$$

In Equation 3, C2 denotes the charge capacitance of the second liquid crystal capacitor Clc2, C1 denotes the charge capacitance of the first liquid crystal capacitor Clc1, Cp denotes the charge capacitance of the sharing capacitor Cup, and Rrs denotes the resistance value of the connection resistor Rs.

After a time interval corresponding to the three times of the time constant Pτ, the response of the circuit reaches 95%. When the time interval corresponding to three times of the time constant PTτ is greater than the length of the second period Ft2, the first, second, and third transistors TR1, TR2, and TR3 are turned on before the first node node_a and the second node node_b are electrically connected to each other. Thus, the time interval corresponding to the three times of the time constant Pτ is smaller than the time interval corresponding to one frame period.

The resistance value Rrs of the connection resistor Rs, which satisfies the above-mentioned conditions, is determined by the following Equation 4.

$$100 \text{ s } Ron < Rrs < \frac{Ft}{3 \text{ s}(C2+Cp//C1)} \qquad \text{Equation 4}$$

In Equation 4, Ft denotes the time interval corresponding to one frame period, and Ron denotes the turn-on resistance of the second transistor TR2 and the third transistor TR3.

Meanwhile, when the first node node_a and the second node node_b are electrically connected to each other via the connection resistor Rs during the second period Ft2, the voltage level at the first node node_a is the same as the voltage level at the second node node_b, since the first node node_a and the second node node_b share electric charge.

According to the conservation law of electric charge, a sum of the electric charge at the first node node_a and the electric charge at the second node node_b during the second period Ft2 is the same as a sum of the electric charge at the first node node_a and the electric charge at the second node node_b during the first period Ft1.

$$Qa+Qb=(Vab-Vcom)S(C2+C1//Cp) \qquad \text{Equation 5}$$

In Equation 5, C1 denotes the charge capacitance of the first liquid crystal capacitor Clc1, and Vab denotes the voltage between the first node node_a and the second node node_b during the second period Ft2. As described above, the voltage level at the first node node_a is the same as the voltage level at the second node node_b during the first period Ft1.

As shown in FIGS. 8 and 9, the voltage level at each of the first node node_a and the second node node_b is reduced by a predetermined level KB at the transition between the first period Ft1 and the second period Ft2. This is because a kickback voltage, corresponding to the voltage difference between the data voltage and the charged voltage in the liquid crystal capacitor, occurs when the gate signal falls to a low level from a high level. That is, when the gate signal falls to the low level from the high level, an electric charge sharing phenomenon occurs between the liquid crystal capacitor and a parasitic capacitor generated on the thin film transistor, reducing the level of the voltage charged in the liquid crystal capacitor.

The influence of the kickback voltage has been omitted in Equations 3 to 5. The influence of the kickback voltage will also be omitted in Equations 6, 7, and 8. In addition, the voltage level at the third node node_c is decreased by the kickback voltage when the first period Ft1 is changed to the second period Ft2.

When using Equations 1, 2, and 5, the voltage level at the first node node_a and the second node node_b during the second period Ft2 is as follows.

$$Vab = Vcom + \frac{(Vd-Vcom) \text{ s } C2 + (Vr1-Vd) \text{ s } Cp}{C2+C1//Cp} \qquad \text{Equation 6}$$

The voltage level at the first node node_a and the second node node_b is varied according to the change from the first period Ft1 to the second period Ft2.

The first node node_a has a voltage level the same as the voltage level of the data voltage when the gate signal is at the high level, and has a voltage level according to Equation 6 when the gate signal is at the low level.

As shown in FIG. 9, the voltage level at the first node node_a is reduced at a time point where the first period Ft1 ends and the second period Ft2 begins (e.g., right after the first period Ft1), and is reduced by a predetermined level KB due to the kickback voltage.

In addition, the voltage level at the first node node_a is reduced during a predetermined period (hereinafter, referred to as charge sharing period CSP) of the second period Ft2, and is substantially uniformly maintained after the charge sharing period CSP until the gate signal is applied to the gate line in the next frame period. In this case, a time point at which the charge sharing period CSP starts is the same as a time point at which the second period Ft2 starts.

FIG. 9 shows a pixel in which the charge capacitance of the sharing capacitor Cup is about 0.1 pF and the resistance value of the connection resistor Rs is about 0.57×109 ohms. In FIG. 9, the time period corresponding to the charge sharing period CSP is about 216 microseconds, and the times along the x-axis represent relative times.

On the other hand, the second node node_b has the same voltage level as the voltage level of the first reset voltage when the gate signal is at its high level, and has a voltage level according to Equation 6 when the gate signal is at its low level. Since the voltage level according to Equation 6 is greater than the level of the first reset voltage, the voltage level at the second node node_b increases from the first period Ft1 to the second period Ft2. The voltage level at the second node node_b is substantially uniformly maintained before the gate-on signal is applied to the gate line during the next frame period after the charge sharing period CSP.

The voltage level at the third node node_c also changes from the first period Ft1 to the second period Ft2. In more detail, the voltage level at the third node node_c is increased by capacitive coupling with the sharing capacitor Cup during the second period Ft2. The voltage level at the third node node_c is increased during the charge sharing period CSP, and substantially uniformly maintained after the charge sharing period CSP before the gate-on signal is applied to the gate line during the next frame period.

The voltage at the third node node_c in the second period Ft2 is represented by the following Equation 7.

$$Vc = Vd + \frac{Cp}{C1 + Cp}s\ (Vab - Vcom)\quad \text{Equation 7}$$

Consequently, according to Equations 5 to 7, the voltage level of the first pixel electrode PE1 is increased and the voltage level of the second pixel electrode PE2 is decreased from the first period Ft1 to the second period Ft2.

In other words, the charge amount in the first liquid crystal capacitor Clc1 is decreased to a predetermined level right after the first period Ft1, and is gradually increased from the predetermined level during the charge sharing period CSP. Conversely, the charge amount in the second liquid crystal capacitor Clc2 is decreased to the predetermined level right after the first period Ft1, and is gradually decreased from the predetermined level during the charge sharing period CSP. Accordingly, the charge amount in the first liquid crystal capacitor Clc1 and the charge amount in the second liquid crystal capacitor Clc2 become different from each other after the charge sharing period CSP.

Since the charge amount in the first liquid crystal capacitor Clc1 is different from the charge amount in the second liquid crystal capacitor Clc2 during the second period Ft2, the liquid crystal molecules disposed corresponding to the first sub-pixel SPX1 are aligned differently than the liquid crystal molecules disposed corresponding to the second sub-pixel SPX2. Thus, the image passing through the first sub-pixel SPX1 and the image passing through the second sub-pixel SPX2 are provided to a user in different directions from each other, thereby widening the viewing angle of the image provided through the pixel PX.

In addition, since the first reset voltage is applied to the sharing capacitor Cup during the second period Ft2, the sharing capacitor Cup is initialized. As a result, the reliability of the sharing capacitor Cup may be improved.

Figure 10:
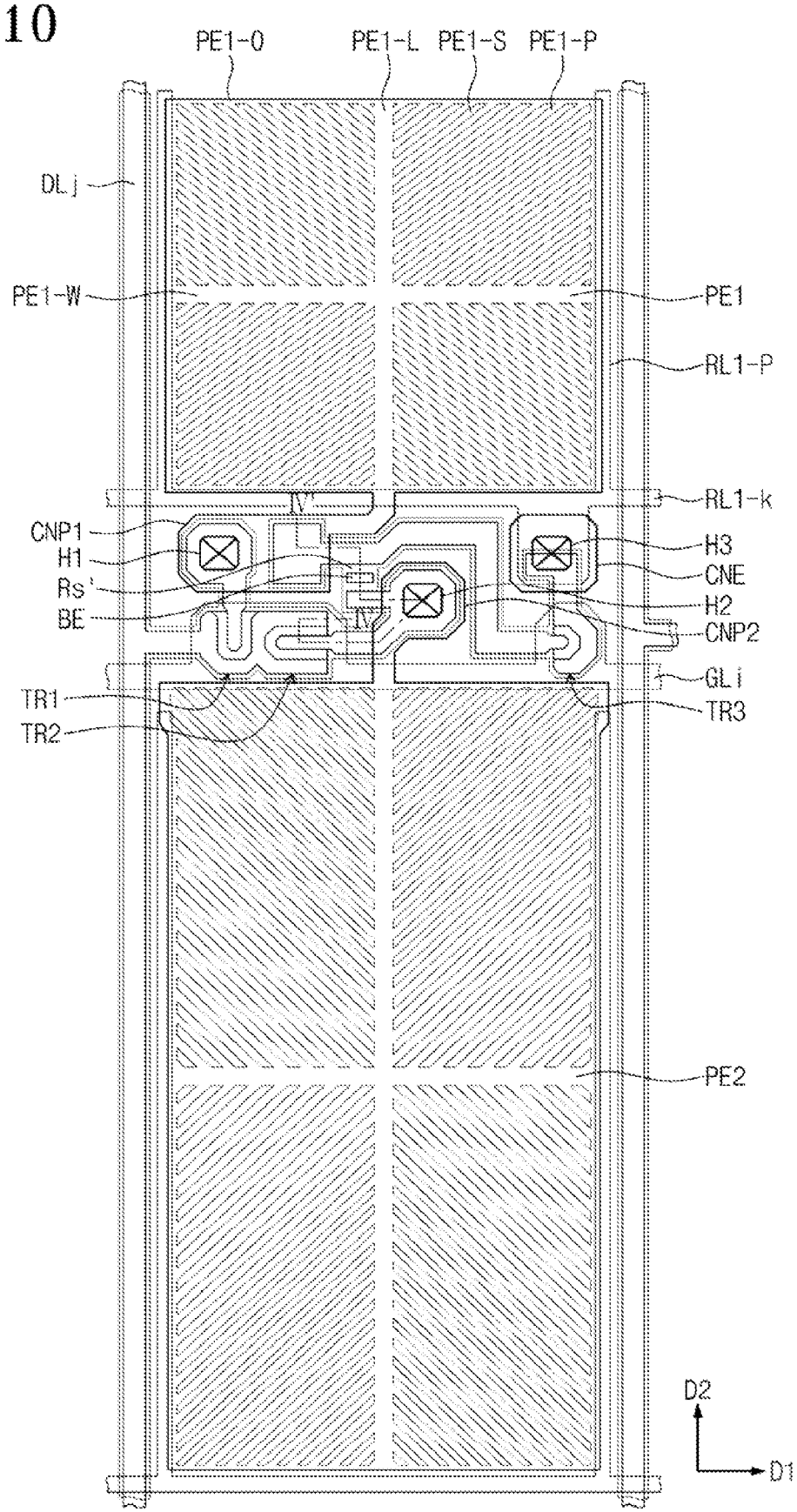
FIG. 10 is a plan view showing the pixel shown in FIG. 1 according to another exemplary embodiment of the present invention.
Figure 11:
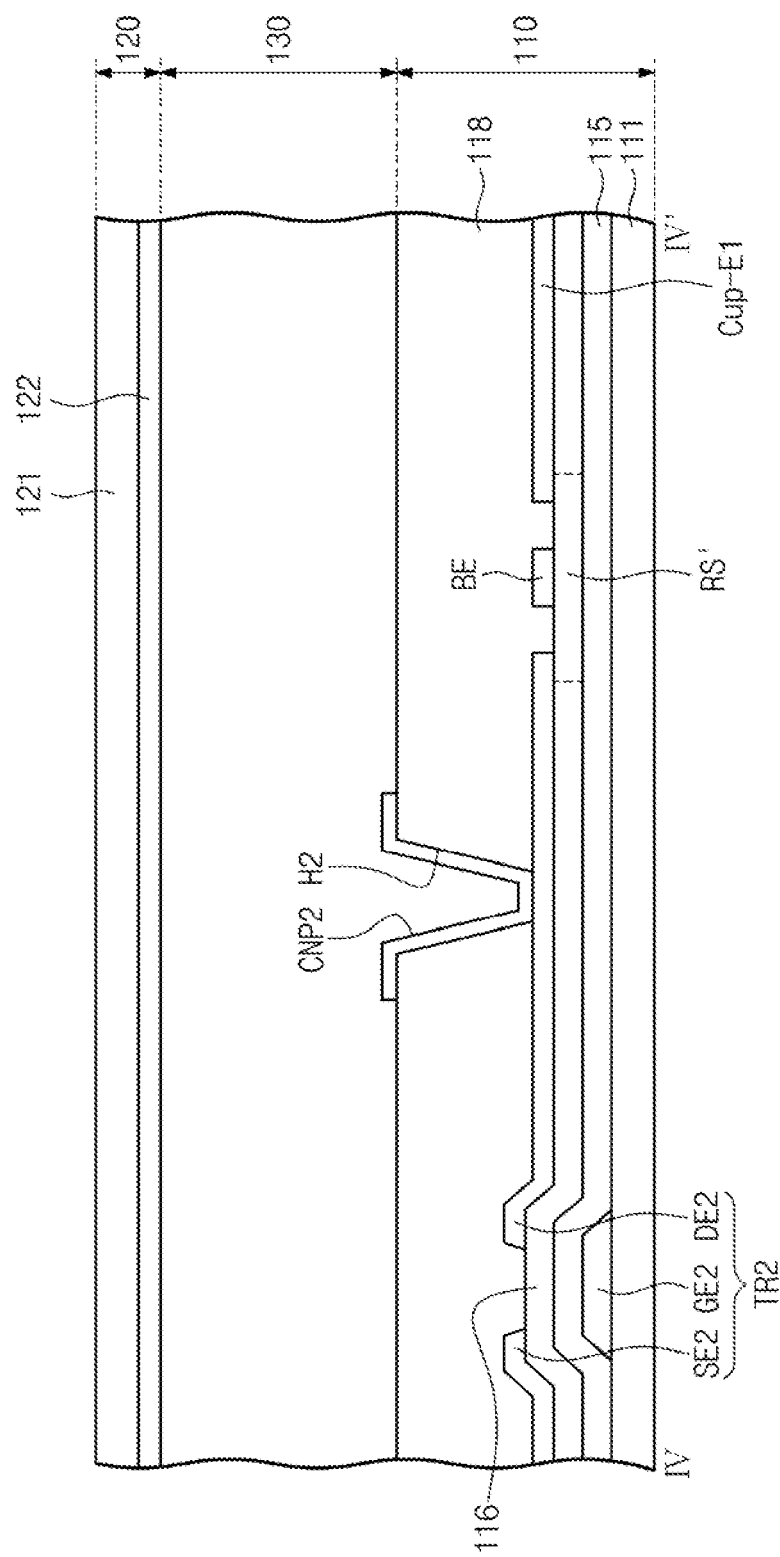
FIG. 11 is a cross-sectional view taken along a line IV-IV' shown in FIG. 10.

FIG. 10 is a plan view showing the pixel shown in FIG. 1 according to another exemplary embodiment of the present invention, and FIG. 11 is a cross-sectional view taken along the line IV-IV' shown in FIG. 10. In FIGS. 10 and 11, the same reference numerals denote the same elements in FIGS. 1 to 9, and thus detailed descriptions of the same elements will be omitted.

Referring to FIGS. 10 and 11, the liquid crystal display includes a first substrate 110 including the first, second, and third transistors TR1, TR2, and TR3 disposed thereon, a second substrate 120 facing the first substrate 110 and including a common electrode 122 disposed thereon, and a liquid crystal layer 130 interposed between the first substrate 110 and the second substrate 120.

The first substrate 110 includes a first base substrate 111 on which the gate line GLi and the data line DLj are disposed. The gate line GLi is extended in a first direction D1, and the data line DLj is extended in a second direction D2 crossing the first direction D1. The data line DLj is insulated from the gate line GLi while crossing the gate line GLi.

In addition, a first reset line RL1-k is disposed on the first base substrate 111 and extends in both the first and second directions D1 and D2 to receive the reset voltage. The first reset line RL1-k may be disposed on the same layer as the gate line GL.

For the operation of the second transistor TR2, an active layer 116 is disposed in an area corresponding to the second source electrode SE, an area corresponding to the second drain electrode DE2, and an area between the source electrode SE and the drain electrode DE when viewed in a plan view. In a cross-sectional view, the active layer 116 is disposed between the second source electrode SE2 and the first insulating layer 115, and between the second drain electrode DE2 and the first insulating layer 115. An ohmic contact layer (not shown) may be further disposed between the active layer 116 and the second source electrode SE2, and between the active layer 116 and the drain electrode DE2.

The second drain electrode DE2 of the second transistor TR2 and the third drain electrode DE3 of the third transistor TR3 are disposed adjacent to each other, but the second drain electrode DE2 and the third drain electrode DE3 are spaced apart from, and physically separated from, each other by a predetermined distance.

A connection resistor Rs' is disposed in the area between the second drain electrode DE2 and the third drain electrode DE3. The connection resistor Rs' is disposed on the same layer as the active layer 116. In addition, the connection resistor Rs' may be formed of the same material as the active layer 116, and integrally formed with the active layer 116 of the first, second, and third transistors TR1, TR2, and TR3.

For instance, that portion of the active layer 116 which connects the active layer 116 disposed under the second drain electrode DE2 to the active layer 116 disposed under the third drain electrode DE3 may serve as the connection resistor Rs'.

Thus, the second drain electrode DE2 and the third drain electrode DE3 are physically connected to each other by the connection resistor Rs'. In addition, the second drain electrode DE2 and the third drain electrode DE3 may be electrically connected to each other by the connection resistor Rs' during the second period Ft2.

In the present exemplary embodiment, a bridge electrode BE may be further disposed on the connection resistor Rs' in order to reduce the resistance value between the second drain electrode DE2 and the third drain electrode DE3. The bridge electrode BE has an island shape on the connection resistor Rs'.

The bridge electrode BE is disposed on the same layer as the second drain electrode DE2. In addition, the bridge electrode BE is formed of the same material as the conductors of the first, second, and third transistors TR1, TR2, and TR3, and thus the bridge electrode BE has a resistance value lower than that of the connection resistor Rs'.

When the second drain electrode DE2 and the third drain electrode DE3 are electrically connected to each other during the second period Ft2, the bridge electrode BE serves as a path through which the electric charges move. In the present exemplary embodiment, multiple bridge electrodes BE may be provided, where the bridge electrodes BE are spaced apart from each other when two or more bridge electrodes BE are provided.

FIGS. 12 to 16 are equivalent circuit diagrams showing pixels according to various exemplary embodiments of the present invention. In FIGS. 12 to 16, the same reference numerals denote the same elements in FIGS. 1 to 11, and thus detailed descriptions of the same elements will be omitted.

Figure 12:
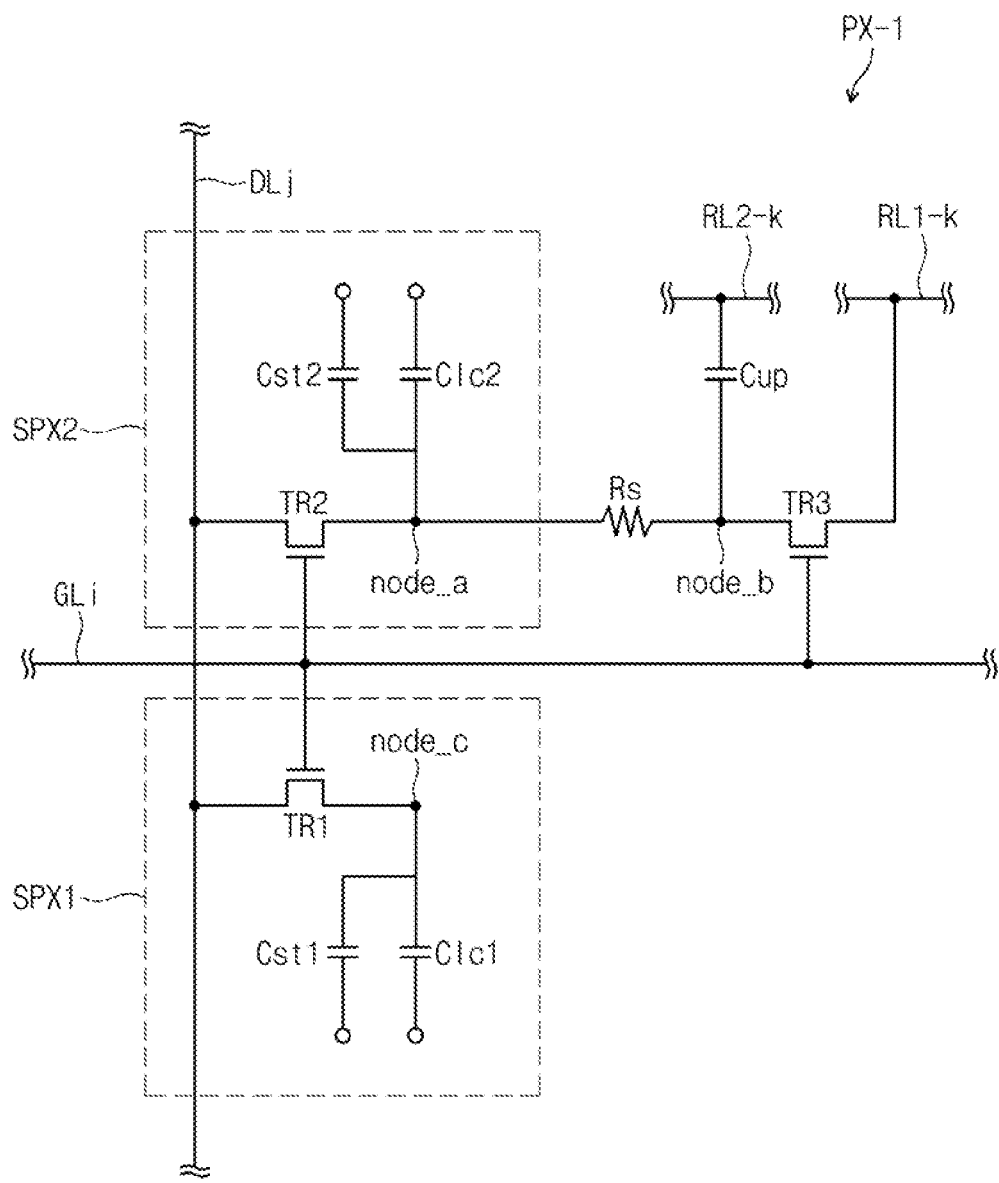
FIG. 12 is an equivalent circuit diagram showing a pixel according to another exemplary embodiment of the present invention.

Referring to FIG. 12, a pixel PX-1 includes the first sub-pixel SPX1, the second sub-pixel SPX2, the third transistor TR3, the connection resistor Rs, and the sharing capacitor Cup.

The first electrode of the sharing capacitor Cup is connected to the second node node_b to be electrically connected to the third thin film transistor TR3, and the second electrode of the sharing capacitor Cup is connected to a reset line. The reset line to which the second electrode of the sharing capacitor Cup is connected is a second reset line RL2-k, which carries a voltage (hereinafter, referred to as second reset voltage) different from the voltage applied to the first reset line RL1-k.

The pixel PX-1 has the same structure and circuit configuration as that of the pixel PX shown in FIG. 1 except for the connection structure of the sharing capacitor Cup, and thus the same elements will be assigned the same reference numerals and details of the same elements will be omitted.

As described with reference to FIGS. 2 and 3, the first node node_a and the second node node_b are electrically disconnected from each other during the first period Ft1. The first pixel electrode PE1 of the first liquid crystal capacitor Clc1 and the second pixel electrode PE2 of the second liquid crystal capacitor Clc2 receive the data voltage during the first period Ft1.

In addition, the sharing capacitor Cup receives the second reset voltage from the second reset line RL2-k and the first reset voltage from the third transistor TR3 to charge the voltage difference between the first reset voltage and the second reset voltage. In the present exemplary embodiment, each of the first and second reset voltages may have a voltage level different from that of the data voltage.

After the first period Ft1, the first node node_a and the second node node_b are electrically connected to each other by the connection resistor Rs, so that an electric charge sharing phenomenon occurs between the first node node_a and the second node node_b. Accordingly, the voltage level at the first node node_a becomes equal to the voltage level at the second node node_b. As a result, the voltage level at the first node node_a is decreased.

Since the charge amount in the second liquid crystal capacitor Clc2 is reduced according to the decrease in voltage level at the first node node_a, the charge amount in the first liquid crystal capacitor Clc1 becomes different from the charge amount in the second liquid crystal capacitor Clc2. Therefore, the liquid crystal molecules disposed corresponding to the first sub-pixel SPX1 and the liquid crystal molecules disposed corresponding to the second sub-pixel SPX2 are aligned in different directions from each other. Accordingly, the image passing through the first sub-pixel SPX1 and the image passing through the second sub-pixel SPX2 are provided to the user in different directions from each other, thereby widening the viewing angle of the image provided through the pixel PX.

Figure 13:
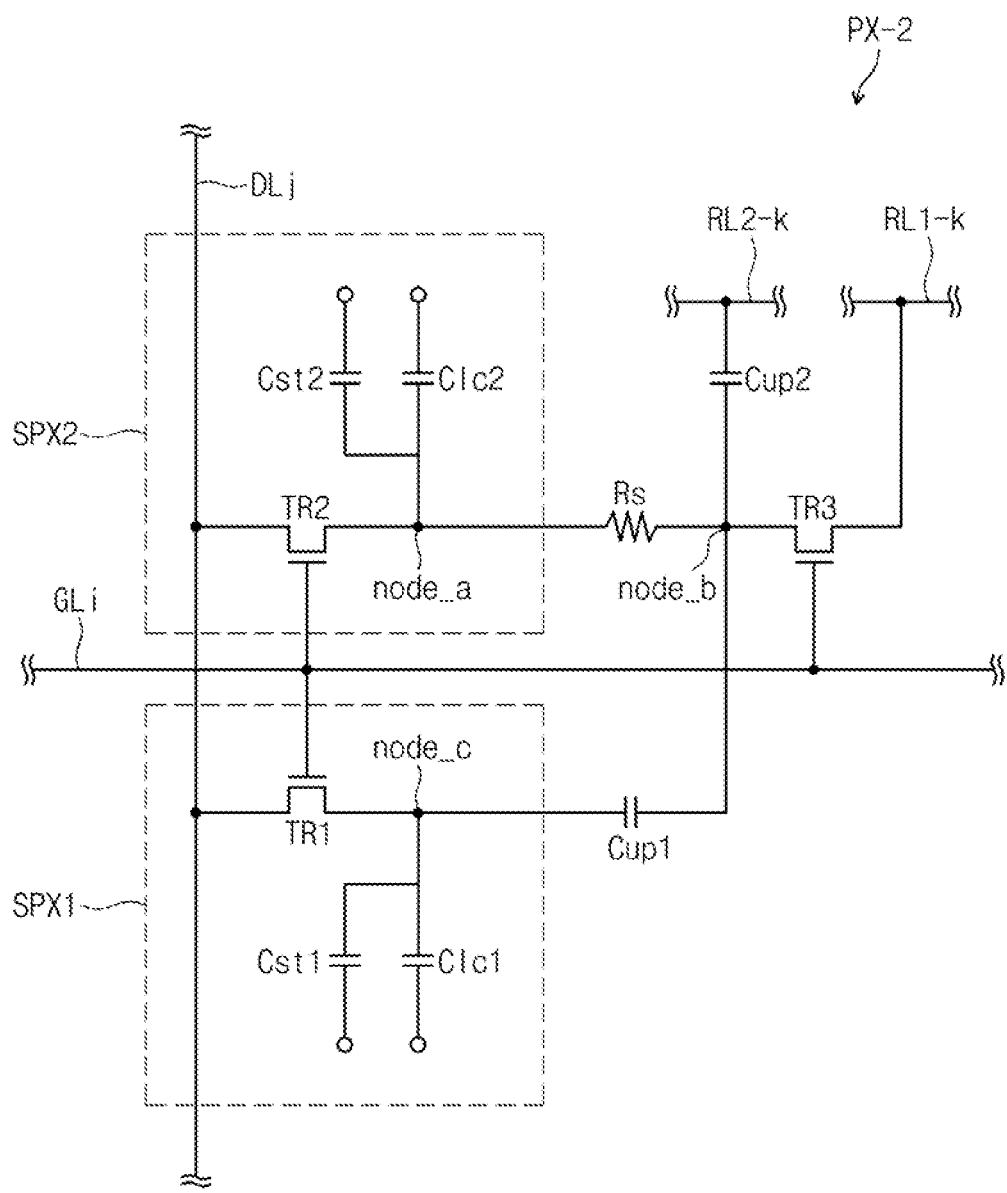
FIG. 13 is an equivalent circuit diagram showing a pixel according to another exemplary embodiment of the present invention.

Referring to FIG. 13, a pixel PX-2 includes the first sub-pixel SPX1, the second sub-pixel SPX2, the third transistor TR3, the connection resistor Rs, a first sharing capacitor Cup1, and a second sharing capacitor Cup2.

In the present exemplary embodiment, a first electrode of the first sharing capacitor Cup1 is connected to the third node node_c, and a second electrode of the first sharing capacitor Cup1 is connected to the second node node_b. The first sharing capacitor Cup1 performs the same function as the sharing capacitor Cup described with reference to FIGS. 1 to 9.

In addition, a first electrode of the second sharing capacitor Cup2 is connected to the second node node_b, and a second electrode of the second sharing capacitor Cup2 is connected to a reset line. In the present exemplary embodiment, the reset line to which the second electrode of the second sharing capacitor Cup2 is connected is the second reset line RL2-k. The second sharing capacitor Cup2 carries out the same function as the sharing capacitor described with reference to FIG. 10.

As described previously, the first node node_a and the second node node_b are electrically disconnected from each other during the first period Ft1. The first pixel electrode PE1 of the first liquid crystal capacitor Clc1 and the second pixel electrode PE2 of the second liquid crystal capacitor Clc2 receive the data voltage during the first period Ft1. During the second period Ft2, the first node node_a and the second node node_b are electrically connected to each other by the connection resistor Rs, so that a charge sharing phenomenon occurs between the first node node_a and the second node node_b.

When the voltage level at the first node node_a becomes equal to the voltage level at the second node node_b, the voltage level at the first node node_a is decreased. Conversely, the voltage level at the third node node_c is increased by capacitive coupling with the first sharing capacitor Cup1.

Consequently, the charge amount in the first liquid crystal capacitor Clc1 is different from the charge amount in the second liquid crystal capacitor Clc2 during the second period Ft2, and the liquid crystal molecules disposed corresponding to the first sub-pixel SPX1 and the liquid crystal molecules disposed corresponding to the second sub-pixel SPX2 are aligned in different directions from each other.

Figure 14:
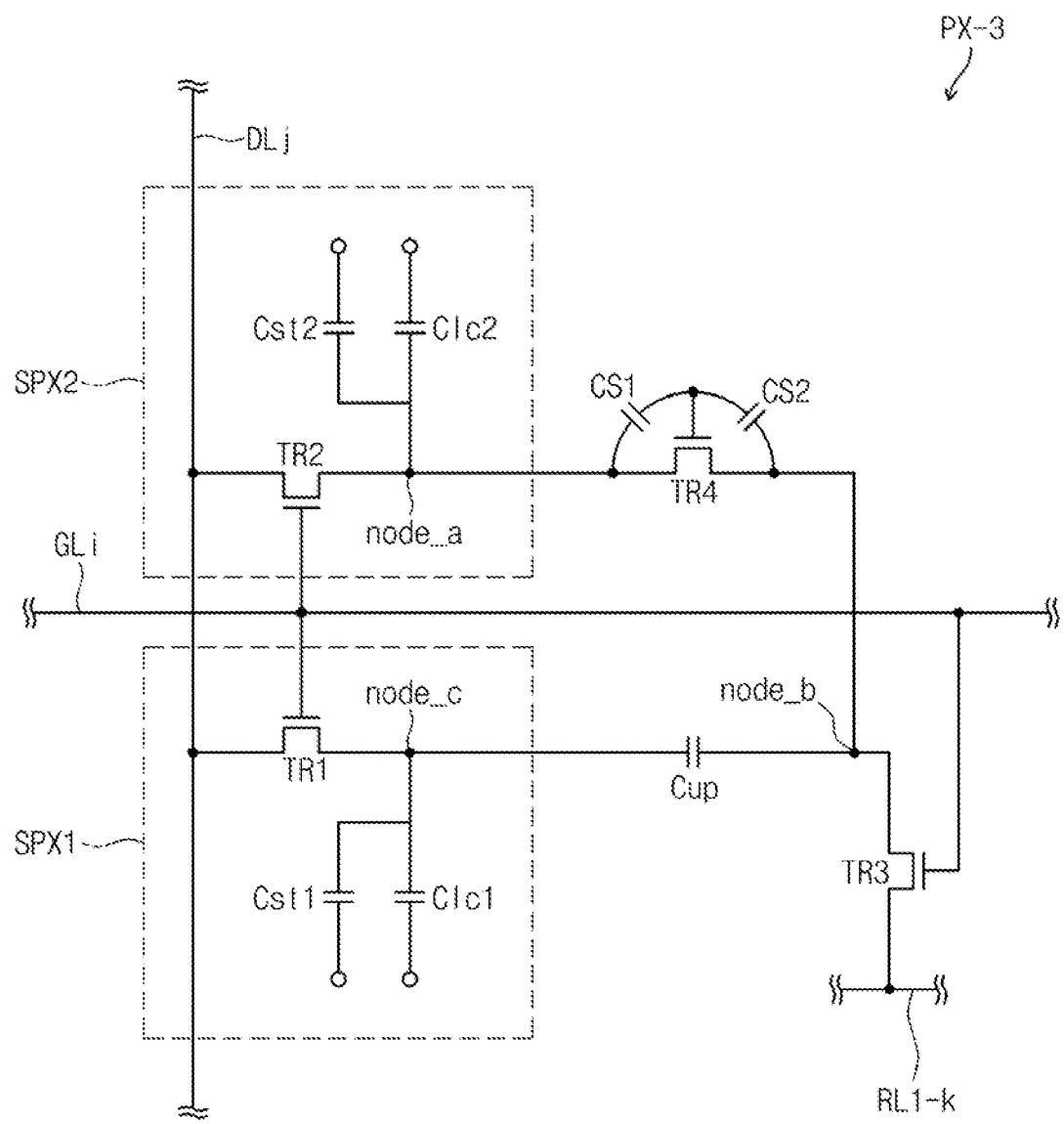
FIG. 14 is an equivalent circuit diagram showing a pixel according to another exemplary embodiment of the present invention.

As shown in FIG. 14, a pixel PX-3 includes the first sub-pixel SPX1, the second sub-pixel SPX2, the third transistor TR3, and the sharing capacitor Cup.

Unlike the pixels PX, PX-1, and PX-2 shown in FIGS. 1 to 13, the pixel PX-3 includes a fourth transistor TR4 connected between the first node node_a and the second node node_b.

Since the pixel PX-3 includes the same structures as those of the pixel PX shown in FIGS. 1 to 9 except for the fourth transistor TR4, the same elements will be assigned the same reference numerals and details of the same elements will be omitted.

The fourth transistor TR4 includes a fourth source electrode connected to the first node node_a, a fourth drain electrode connected to the second node node_b, and a fourth gate electrode that is floated.

The fourth transistor TR4 is connected to the second transistor TR2 at the first node node_a, to receive the data voltage output from the second transistor TR2. The fourth transistor TR4 is driven according to parasitic capacitors generated between the fourth source electrode and the fourth gate electrode, and between the fourth drain electrode and the fourth gate electrode. For instance, when a charge capacitance of a first parasitic capacitor CS1 generated by coupling of the fourth source electrode and the fourth gate electrode is equal to a charge capacitance of a second parasitic capacitor CS2 generated by coupling of the fourth drain electrode and the fourth gate electrode, the voltage of the fourth gate electrode is represented by the following Equation 8.

$$Vg4 = \frac{(Vd4 + Vs4)}{2}, (Cdg = Csg) \quad \text{Equation 8}$$

In Equation 8, Vg4 denotes the voltage of the fourth gate electrode, Vd4 denotes the voltage of the fourth drain electrode, and Vs4 denotes the voltage of the fourth source electrode. In addition, Csg denotes the charge capacitance of the first parasitic capacitor CS1 and Cdg denotes the charge capacitance of the second parasitic capacitor CS2. Hereinafter, the pixel PX-3 will be described on the assumption that the charge capacitance of the first parasitic capacitor CS1 is equal to the charge capacitance of the second parasitic capacitor CS2.

During the first period Ft1, the first transistor TR1, the second transistor TR2, and the third transistor TR3 are turned on and the fourth transistor TR4 is not turned on, so the first node node_a and the second node node_b are electrically disconnected from each other.

During the first period Ft1, the fourth source electrode has the same electric potential level as the first node node_a and the fourth drain electrode has the same electric potential level as the second node node_b.

The first liquid crystal capacitor Clc1 and the second liquid crystal capacitor Clc2 receive the data voltage and the common voltage, respectively, and are charged with the voltage difference between the data voltage and the common voltage.

In addition, the sharing capacitor Cup receives the first reset voltage from the third transistor TR3 through the second node node_b, and receives the data voltage through the third node node_c to charge the voltage difference between the first reset voltage and the data voltage.

In this case, an input voltage of the fourth transistor TR4 is defined by the voltage difference between the fourth source electrode and the fourth gate electrode. According to Equation 8, the voltage of the fourth gate voltage is decided by the voltage of the fourth source electrode and the voltage of the fourth drain electrode. Accordingly, the input voltage of the fourth transistor TR4 is decided by the difference between the voltage of the fourth drain electrode and the voltage of the fourth source electrode.

During the first period Ft1, the fourth source electrode is connected to the first node node_a to which the data voltage is applied, and the fourth drain electrode is connected to the second node node_b to which the first reset voltage is applied. Accordingly, the electric potential of the fourth source electrode is higher than the electric potential of the fourth drain electrode during the first period Ft1. In addition, the electric potential of the fourth source electrode is higher than the electric potential of the fourth gate electrode during the first period Ft1.

When the fourth transistor TR4 receives the data voltage, the voltage charged in the first parasitic capacitor Cs1 is increased and the voltage of the fourth gate electrode is increased. Thus, a current flows from the first node node_a to the second node node_b and the voltage of the fourth drain electrode starts to increase.

During the second period Ft2, the first, second, and third transistors TR1, TR2, and TR3 are turned off. However, the fourth transistor TR4 is maintained in the on state until the voltage of the fourth drain electrode, the voltage of the fourth source electrode, and the voltage of the fourth gate electrode become the same level. Thus, the voltage of the source electrode decreases and the voltage of the fourth drain electrode increases.

In this case, since the fourth source electrode has the same voltage level as the second pixel electrode PE2 of the second liquid crystal capacitor Clc2, the voltage level of the second pixel electrode PE2 decreases according to the decrease of the voltage level of the fourth source electrode.

On the other hand, the voltage level at the second node node_b increases according to the increase of the voltage level of the fourth drain electrode. In addition, as described with reference to FIG. 3, the voltage level at the third node node_c increases and the voltage level of the first pixel electrode PE1 increases according to the increase of voltage level at the second node node_b.

Accordingly, during the second period Ft2, the charge amount in the first liquid crystal capacitor Clc1 increases and the charge amount in the second liquid crystal capacitor Clc2 decreases.

When the charge amount in the first liquid crystal capacitor Clc1 becomes different from the charge amount in the second liquid crystal capacitor Clc2, the liquid crystal molecules disposed corresponding to the first sub-pixel SPX1 are aligned different from the liquid crystal molecules disposed corresponding to the second sub-pixel SPX2. Consequently, the image passing through the first sub-pixel SPX1 and the image passing through the second sub-pixel SPX2 are provided to the user in different directions from each other, thereby widening the viewing angle of the image provided through the pixel PX-3.

Figure 15:
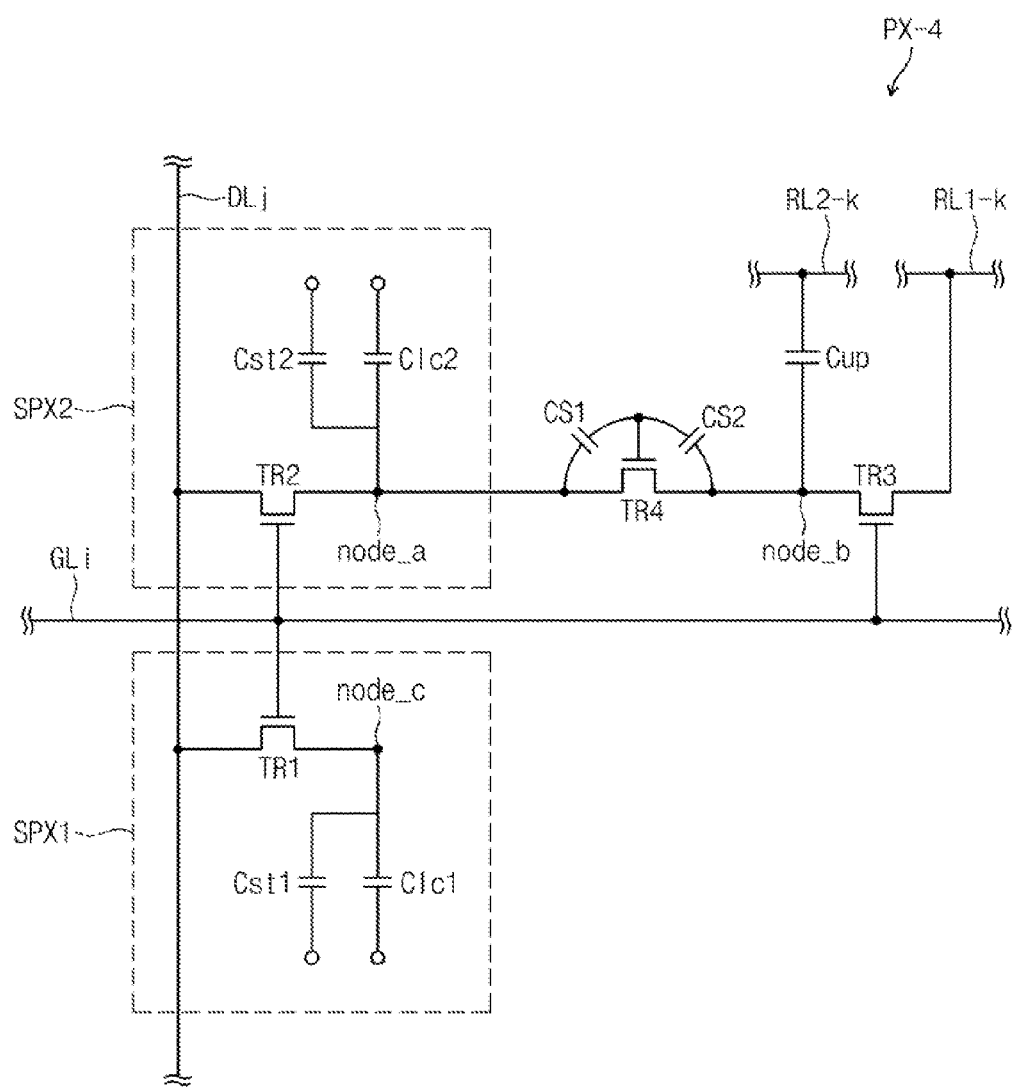
FIG. 15 is an equivalent circuit diagram showing a pixel according to another exemplary embodiment of the present invention.

Referring to FIG. 15, a pixel PX-4 includes the first sub-pixel SPX1, the second sub-pixel SPX2, the third transistor TR3, the fourth transistor TR4, and the sharing capacitor Cup.

In the pixel PX-4 according to the present exemplary embodiment, the connection resistor Rs included in the pixel PX-2 shown in FIG. 12 is replaced with the fourth transistor TR4. In more detail, the first electrode of the sharing capacitor Cup is connected to the second node node_b, and the second electrode of the sharing capacitor Cup is connected to a reset line to receive a reset voltage. The second electrode of the sharing capacitor Cup may be connected to the second reset line RL2-k as shown in FIG. 14. In addition, the fourth transistor TR4 is connected between the first node node_a and the second node node_b.

During the first period Ft1, the first transistor TR1, the second transistor TR2, and the third transistor TR3 are turned on and the fourth transistor TR4 is maintained in its off state (i.e., turned off). Accordingly, the first node node_a and the second node node_b are electrically disconnected from each other.

The first pixel electrode PE1 of the first liquid crystal capacitor Clc1 receives the data voltage and the second pixel electrode PE2 of the second liquid crystal capacitor Clc2 receives the data voltage.

During the second period Ft2, the first, second, and third transistors TR1, TR2, and TR3 are turned off. However, the fourth transistor TR4 is maintained in its on state until the voltage of the fourth drain electrode, the voltage of the fourth source electrode, and the voltage of the fourth gate electrode become the same level.

As described with reference to FIG. 14, the voltage level of the second pixel electrode PE2 is reduced during the second period Ft2. In the present exemplary embodiment, since the second node node_b and the third node node_c are electrically disconnected from each other, the voltage level of the first pixel electrode PE1 is substantially uniformly maintained during the second period Ft2.

Consequently, the charge amount in the first liquid crystal capacitor Clc1 becomes different from the charge amount in the second liquid crystal capacitor Clc2, since the charge amount in the second liquid crystal capacitor Clc2 decreases. As a result, the liquid crystal molecules disposed corresponding to the first sub-pixel SPX1 and the liquid crystal molecules disposed corresponding to the second sub-pixel SPX2 are aligned in different directions from each other.

Figure 16:
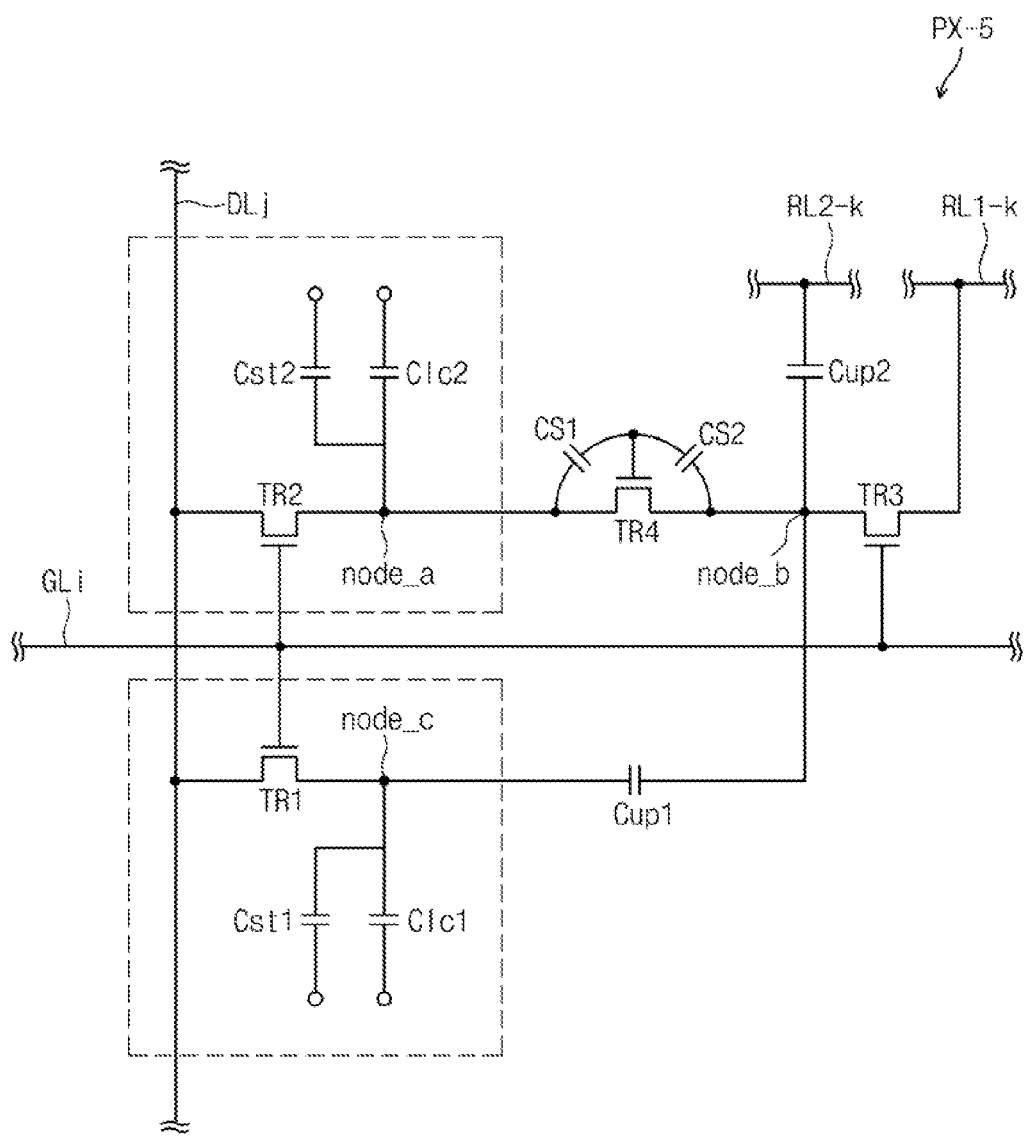
FIG. 16 is an equivalent circuit diagram showing a pixel according to another exemplary embodiment of the present invention.

Referring to FIG. 16, a pixel PX-5 includes a first sub-pixel SPX1, a second sub-pixel SPX2, the third transistor TR3, and the fourth transistor TR4. In addition, the pixel PX-5 further includes a first sharing capacitor Cup1 and a second sharing capacitor Cup2.

In the pixel PX-5 according to the present exemplary embodiment, the connection resistor Rs included in the pixel PX-2 shown in FIG. 13 is replaced with the fourth transistor TR4. The fourth transistor TR4 is connected between the first node node_a and the second node node_b.

The first electrode of the first sharing capacitor Cup1 is connected to the third node node_c and the second electrode of the first sharing capacitor Cup1 is connected to the second node node_b. The first sharing capacitor Cup1 performs the function of the sharing capacitor Cup described with reference to FIGS. 1 to 9.

The first electrode of the second sharing capacitor Cup2 is connected to the second node node_b, and the second electrode of the second sharing capacitor Cup2 is connected to a reset line. In the present exemplary embodiment, the reset line to which the second electrode of the second sharing capacitor Cup2 is connected may be the second reset line RL2-k. The second sharing capacitor Cup2 performs the function of the sharing capacitor Cup described with reference to FIG. 12.

During the first period Ft1, the first, second, and third transistors TR1, TR2, and TR3 are turned on, and the fourth transistor TR4 is not turned on. Accordingly, the first node node_a and the second node node_b are electrically disconnected from each other.

The first pixel electrode PE1 of the first liquid crystal capacitor Clc1 receives the data voltage and the second pixel electrode PE2 of the second liquid crystal capacitor Clc2 receives the data voltage.

During the second period Ft2, the first, second, and third transistors TR1, TR2, and TR3 are turned off. However, the fourth transistor TR4 is maintained in its on state until the voltage of the fourth drain electrode, the voltage of the fourth source electrode, and the voltage of the fourth gate electrode become the same level.

As described with reference to FIG. 14, the voltage level of the second pixel electrode PE2 is reduced during the second period Ft2. On the other hand, the voltage level at the third node node_c is increased by capacitive coupling with the first sharing capacitor Cup1.

Consequently, the charge amount in the first liquid crystal capacitor Clc1 becomes different from the charge amount in the second liquid crystal capacitor Clc2, and the liquid crystal molecules disposed corresponding to the first sub-pixel SPX1 and the liquid crystal molecules disposed corresponding to the second sub-pixel SPX2 are aligned in different directions from each other.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A liquid crystal display, comprising:
a gate line configured to receive a gate-on signal during a first period of a frame period;
a data line crossing the gate line to receive a data voltage;
a first sub-pixel connected to the gate line and the data line to receive the data voltage in response to the gate-on signal;
a second sub-pixel connected to the gate line and the data line to receive the data voltage in response to the gate-on signal;
a first sharing capacitor including a first electrode and a second electrode;
a connection part electrically connecting the first electrode of the first sharing capacitor to the second sub-pixel after the first period;
a first reset line configured to receive a first reset signal;
a first transistor connected to the gate line and the first reset line to output the first reset signal in response to the gate-on signal; and
a second reset line configured to receive a second reset signal, wherein the first electrode of the first sharing capacitor is connected to the first transistor and the second electrode of the first sharing capacitor is connected to the second reset line.

2. The liquid crystal display of claim 1, wherein the second reset signal has a voltage level different from a voltage level of the first reset signal.

3. The liquid crystal display of claim 1, wherein the first sub-pixel comprises a second transistor connected to the gate line and the data line to output the data voltage in response to the gate-on signal and a first liquid crystal capacitor for receiving the data voltage from the second transistor, and the second sub-pixel comprises a third transistor connected to the gate line and the data line to output the data voltage in response to the gate-on signal and a second liquid crystal capacitor for receiving the data voltage from the third transistor.

4. The liquid crystal display of claim 3 wherein, after the first period, the connection part is electrically connected to the second liquid crystal capacitor at a first node and electrically connected to the first electrode of the first sharing capacitor at a second node.

5. The liquid crystal display of claim 4, wherein an amount of electric charge in the second liquid crystal capacitor is reduced during a charge sharing period that occurs after the first period.

6. A liquid crystal display, comprising:
a gate line configured to receive a gate-on signal during a first period of a frame period;
a data line crossing the gate line to receive a data voltage;
a first sub-pixel connected to the gate line and the data line to receive the data voltage in response to the gate-on signal;
a second sub-pixel connected to the gate line and the data line to receive the data voltage in response to the gate-on signal;
a first sharing capacitor including a first electrode and a second electrode, wherein the second electrode is electrically connected to the first sub-pixel;
a connection part electrically connecting the first electrode of the first sharing capacitor to the second sub-pixel after the first period;
a first reset line configured to receive a first reset signal;
a first transistor connected to the gate line and the first reset line to output the first reset signal in response to the gate-on signal;
a second reset line configured to receive a second reset signal; and
a second sharing capacitor including a first electrode connected to the second reset line and a second electrode connected to the first transistor.

7. The liquid crystal display of claim 6, wherein the second reset signal has a voltage level different from a voltage level of the first reset signal.

8. The liquid crystal display of claim 6 wherein, after the first period, the connection part is electrically connected to the second liquid crystal capacitor at a first node and electrically connected to the first electrode of the first sharing capacitor and the second electrode of the second sharing capacitor at a second node, and the second electrode of the first sharing capacitor is electrically connected to the first liquid crystal capacitor at a third node.

9. The liquid crystal display of claim 8, wherein an amount of electric charge in the second liquid crystal capacitor is reduced during a charge sharing period that occurs after the first period.

10. The liquid crystal display of claim 8, wherein an amount of electric charge in the first liquid crystal capacitor is gradually increased during a charge sharing period of the first period.

11. A liquid crystal display, comprising:
a gate line configured to receive a gate-on signal during a first period of a frame period;
a data line crossing the gate line to receive a data voltage;
a first sub-pixel connected to the gate line and the data line to receive the data voltage in response to the gate-on signal;
a second sub-pixel connected to the gate line and the data line to receive the data voltage in response to the gate-on signal;
a first sharing capacitor including a first electrode and a second electrode, wherein the second electrode is electrically connected to the first sub-pixel;
a connection part electrically connecting the first electrode of the first sharing capacitor to the second sub-pixel after the first period;
a first reset line configured to receive a first reset signal; and
a first transistor connected to the gate line and the first reset line to output the first reset signal in response to the gate-on signal;
wherein the first transistor electrically connects the first reset line to the first electrode of the first sharing capacitor during the first period;
wherein the first sub-pixel comprises a second transistor connected to the gate line and the data line to output the data voltage in response to the gate-on signal and a first liquid crystal capacitor for receiving the data voltage from the second transistor, and the second sub-pixel comprises a third transistor connected to the gate line and the data line to output the data voltage in response to the gate-on signal and a second liquid crystal capacitor for receiving the data voltage from the third transistor; and
wherein the connection part comprises a fourth transistor including a source electrode connected to the second liquid crystal capacitor, a drain electrode connected to the first sharing capacitor, and a gate electrode that is floated so as not to receive a corresponding gate-on signal.

12. The liquid crystal display of claim 11, wherein the first electrode of the first sharing capacitor is connected to the drain electrode of the fourth transistor and the second electrode of the first sharing capacitor is connected to the first liquid crystal capacitor.

13. The liquid crystal display of claim 11, further comprising:
a second reset line configured to receive a second reset signal; and
a second sharing capacitor including a first electrode connected to the first transistor and a second electrode connected to the second reset line, wherein the first electrode and the second electrode of the first sharing capacitor are connected to the third transistor and the first liquid crystal capacitor, respectively.

14. The liquid crystal display of claim 13, wherein the second reset signal has a voltage level different from a voltage level of the first reset signal.

15. The liquid crystal display of claim 1, wherein the connection part includes a connection resistor comprising a first material, and the first material has a resistance value that decreases when exposed to a light.

16. The liquid crystal display of claim 1, wherein the connection part comprises a fourth transistor including a source electrode connected to the second liquid crystal capacitor, a drain electrode connected to the first sharing capacitor, and a gate electrode that is floated so as not to receive a corresponding gate-on signal.

17. The liquid crystal display of claim 6, wherein the connection part includes a connection resistor comprising a first material, and the first material has a resistance value that decreases when exposed to a light.

* * * * *